(12) United States Patent
Lin

(10) Patent No.: US 11,551,469 B2
(45) Date of Patent: Jan. 10, 2023

(54) FINGERPRINT RECOGNITION DRIVING METHOD FOR DISPLAY PANEL

(71) Applicant: NOVATEK MICROELECTRONICS CORP., Hsinchu (TW)

(72) Inventor: Wu-Wei Lin, Taoyuan (TW)

(73) Assignee: NOVATEK MICROELECTRONICS CORP., Hsinchu (TW)

( * ) Notice: Subject to any disclaimer, the term of this patent is extended or adjusted under 35 U.S.C. 154(b) by 0 days.

(21) Appl. No.: 17/369,182

(22) Filed: Jul. 7, 2021

(65) Prior Publication Data
US 2022/0012454 A1    Jan. 13, 2022

Related U.S. Application Data
(60) Provisional application No. 63/049,105, filed on Jul. 7, 2020.

(51) Int. Cl.
*G06V 40/13* (2022.01)
*G06F 3/041* (2006.01)

(52) U.S. Cl.
CPC ...... *G06V 40/1318* (2022.01); *G06F 3/04184* (2019.05)

(58) Field of Classification Search
CPC ............ G06V 40/1318; G06F 3/04184; G06F 3/04166; G06F 3/0412; G09G 2310/0202
See application file for complete search history.

(56) References Cited

U.S. PATENT DOCUMENTS

| | | | |
|---|---|---|---|
| 11,049,428 B1* | 6/2021 | Zhou | G06V 40/1318 |
| 2020/0183563 A1* | 6/2020 | Weng | G09G 3/20 |

(Continued)

FOREIGN PATENT DOCUMENTS

| | | |
|---|---|---|
| CN | 104536638 A | 4/2015 |
| CN | 106157890 A | 11/2016 |

(Continued)

OTHER PUBLICATIONS

Di Geng et al., "Touch Sensor Array With Integrated Drivers and Comparator Using a-IGZO TFTs", *IEEE Electron Device Letters*, vol. 38, No. 3, pp. 391-394 (2017).

*Primary Examiner* — Lixi C Simpson
(74) *Attorney, Agent, or Firm* — Marshall, Gerstein & Borun LLP

(57) ABSTRACT

The present disclosure provides a fingerprint recognition driving method for a display panel, the display panel including a fingerprint recognition circuit, a fingerprint recognition driving circuit and a controller, the fingerprint recognition driving circuit being used to provide a fingerprint recognition driving signal to the fingerprint recognition circuit, the fingerprint recognition driving method including: periodically arranging, by the controller, time periods for display and touch in a case that the controller does not receive a fingerprint recognition start signal; periodically arranging, by the controller, time periods for display and touch and time periods for fingerprint recognition at intervals in a case that the controller receives the fingerprint recognition start signal; generating, by the controller, a first fingerprint recognition reset signal during at least one time period for display and touch, and the fingerprint recognition driving circuit being reset under the control of the first fingerprint recognition reset signal.

13 Claims, 14 Drawing Sheets

(56) References Cited

U.S. PATENT DOCUMENTS

2021/0064841 A1* 3/2021 Kim .................... G06F 3/03545
2021/0406508 A1* 12/2021 Shih ........................ G09G 3/20

FOREIGN PATENT DOCUMENTS

| CN | 106326859 A | 1/2017 |
| CN | 103943083 B | 2/2017 |
| CN | 103698927 B | 5/2017 |
| CN | 109964233 A | 7/2019 |

* cited by examiner

FINGERPRINT RECOGNITION DRIVING METHOD FOR DISPLAY PANEL

CROSS REFERENCE TO RELATED APPLICATIONS

This application claims priority to U.S. Provisional Application No. 63/049,105 filed on 7 Jul. 2020, entitled "Clock Control Method and System Processor for Display System", which are incorporated herein by reference in their entirety.

TECHNICAL FIELD

Embodiments of the present disclosure relate to a fingerprint recognition driving method for a display panel.

BACKGROUND

Fingerprint recognition technology has been widely used in various electronic products, such as mobile phones, notebooks, tablets, Personal Digital Assistants (PDAs), portable electronic devices, and the like, to achieve identity recognition. A user may be easily identified with fingerprint recognition. The user only needs to place a finger on a fingerprint recognition panel or area to log in to the electronic device without having to enter a lengthy and cumbersome user name and password.

Among various types of fingerprint recognition technologies, optical fingerprint recognition solutions are usually applied to electronic products with a display screen. Generally, optical fingerprint recognition solutions may be integrated with touch solutions and display solutions. Thus, fingerprint recognition operation, display operation and display touch operation (one or a combination of display operation and display touch operation is referred to as display touch operation) can be implemented simultaneously in electronic devices.

In order to reduce the size of a display apparatus, in-display fingerprint sensing technology may be used to make a fingerprint sensing area overlapped within a display area of a display panel. In-display fingerprint recognition is to embed a fingerprint recognizer array inside the display panel. That is, a display panel with an in-display fingerprint recognition function has an array of display units and an array of in-display fingerprint recognizers. In the case that the display panel further has a touch sensing function, the display panel may have an array of display units, an array of in-display touch sensors, and an array of in-display fingerprint recognizers. Since the fingerprint recognizer array is embedded inside the display panel, operations of the display function and/or the touch sensing function often affect/interfere with operations of the fingerprint recognition function. For in-display fingerprint recognition, how to arrange display driving periods, touch sensing periods, and fingerprint recognition periods is a technical issue.

It should be noted that the content of the "BACKGROUND" paragraphs is used to help understand the present invention. Part of (or all of) the content disclosed in the "BACKGROUND" paragraphs may not be a prior technology known to those with ordinary knowledge in the art. Although disclosed in the "BACKGROUND" paragraphs, it does not mean that this content has been known to those with ordinary knowledge in the art before the application of the present invention.

SUMMARY OF THE DISCLOSURE

A main purpose of the present disclosure is to provide a fingerprint recognition driving method for a display panel, to eliminate or reduce interference between display and touch operation and fingerprint recognition operation.

The present disclosure provides a fingerprint recognition driving method for a display panel, the display panel comprising a fingerprint recognition circuit, a fingerprint recognition driving circuit and a controller, the fingerprint recognition driving circuit being used to provide a fingerprint recognition driving signal to the fingerprint recognition circuit, the fingerprint recognition driving method comprising: periodically arranging, by the controller, time periods for display and touch in a case that the controller does not receive a fingerprint recognition start signal; periodically arranging, by the controller, time periods for display and touch and time periods for fingerprint recognition at intervals in a case that the controller receives the fingerprint recognition start signal; generating, by the controller, a first fingerprint recognition reset signal during at least one time period for display and touch, and the fingerprint recognition driving circuit being reset under the control of the first fingerprint recognition reset signal.

The present disclosure provides a fingerprint recognition driving method for a display panel. The display panel comprises a fingerprint recognition circuit, a fingerprint recognition driving circuit, and a controller, the fingerprint recognition driving circuit being used to provide a fingerprint recognition driving signal to the fingerprint recognition circuit. One layer of a touch sensing layer and a fingerprint sensing layer may be superimposed on the other layer, and the two layers are close to each other, resulting in a huge capacitive load caused by coupling capacitance between the touch sensing layer and the fingerprint sensing layer. During a period for display and touch operation, wires of the fingerprint sensing circuit will form a capacitive load on the display and touch circuit. In order to eliminate or reduce the capacitive load, the fingerprint recognition driving method for a display panel of the embodiments of the present disclosure may be used to control voltages on the fingerprint recognition circuit even though during a time period for display and touch (for example, an anti-loading driving signal is applied to wires of fingerprint sensing pixels to drive the wires, where a frequency, phase and/or amplitude of the anti-loading driving signal is substantially the same as a frequency, phase and/or amplitude of a touch signal, respectively), thereby reducing interference to display and touch signals by the fingerprint sensing layer, and improving the accuracy of the display and touch signals.

BRIEF DESCRIPTION OF THE DRAWINGS

In order to explain technical solutions of embodiments of the present disclosure more clearly, accompanying drawings of the embodiments will be briefly introduced below. Obviously, the accompanying drawings described below only relate to some embodiments of the present disclosure, rather than limit the present disclosure.

DESCRIPTION OF THE EMBODIMENTS

In order to make objectives, technical solutions, and advantages of the embodiments of the present disclosure clearer, the technical solutions of the embodiments of the present disclosure will be described clearly and thoroughly in conjunction with the accompanying drawings. Obviously, the described embodiments are part of but not all of the embodiments of the present disclosure. Based on the described embodiments of the present disclosure, all other embodiments obtained by those of ordinary skill in the art without creative labor are within the protection scope of the present disclosure.

Unless otherwise defined, technical terms or technical terms used in the present disclosure shall have the usual meanings understood by those with ordinary skills in the art to which this disclosure belongs. Words such as "first", "second" and the like as used in the present disclosure do not indicate any order, quantity or importance, but are only used to distinguish different components. Similarly, words such as "a", "one", "the" and the like do not mean a quantity limit, but rather mean that there is at least one. Words such as "comprise", "include" and the like mean that elements or items appearing before the words cover elements or items and equivalents thereof listed after the words, but does not exclude other elements or items. Words such as "coupled", "connected" and the like are not limited to physical or mechanical connections, but may include electrical connections, whether direct or indirect. "Up", "Down", "Left", "Right" and the like are only used to indicate a relative position relationship, and when an absolute position of the described object changes, the relative position relationship may also change accordingly.

Figure 1:
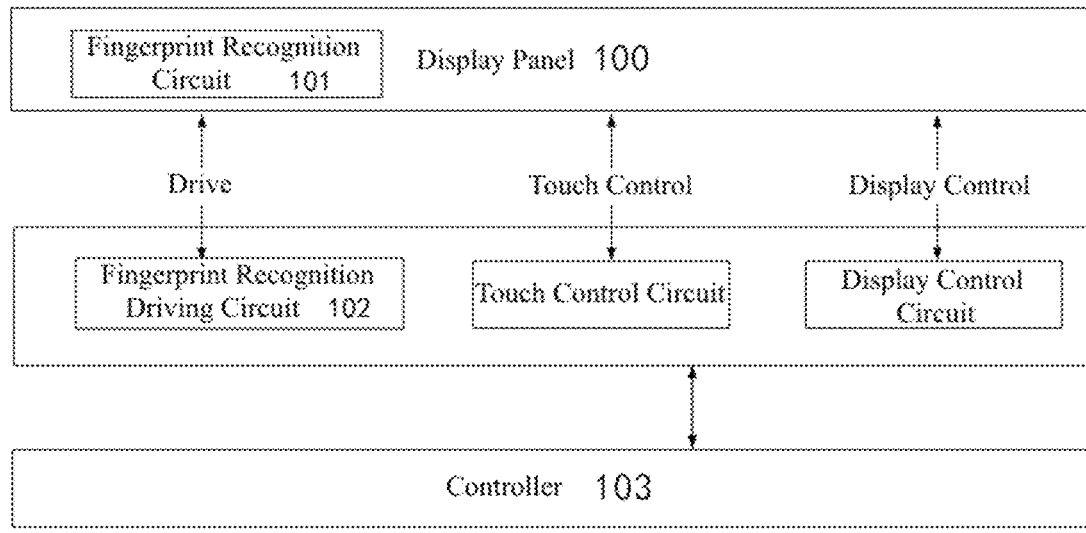
FIG. 1 shows a structural diagram of a display panel according to an embodiment of the present disclosure.

FIG. 1 shows a structural diagram of a display panel 10 according to an embodiment of the present disclosure.

As shown in FIG. 1, the display panel 10 includes a display screen 100. The display screen 100 includes a fingerprint recognition circuit 101. The display panel 10 further includes a fingerprint recognition driving circuit 102 and a controller 103. The controller 103 is used to control the fingerprint recognition driving circuit. The fingerprint recognition driving circuit 102 and the controller 103 may be provided separately from the display screen 100 or may be integrated into the display screen 100. The present disclosure is not limited thereto.

Furthermore, the display panel 10 may also include a touch control circuit and a display control circuit. The controller 103 may also be used to control the touch control circuit and the display control circuit. The touch control circuit and the display control circuit are also referred to as a display and touch control circuit hereinafter.

Figure 2:
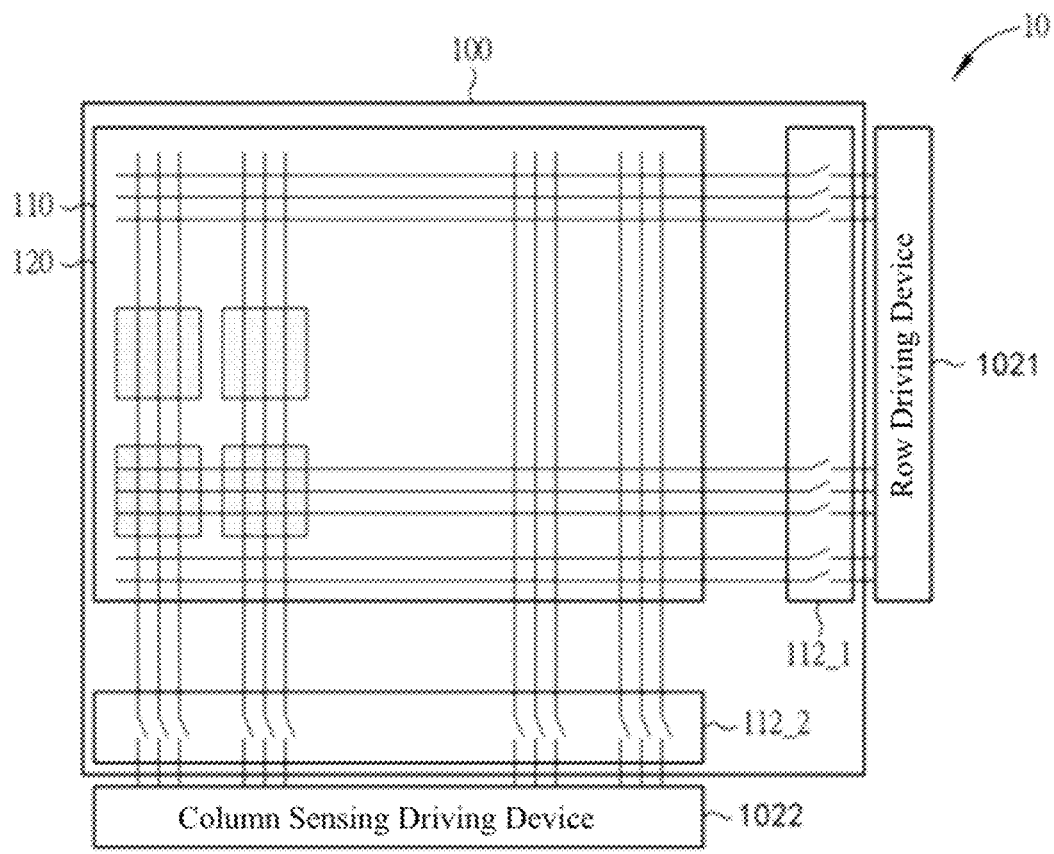
FIG. 2 shows a schematic diagram of a display panel according to an embodiment of the present disclosure.

FIG. 2 shows a schematic diagram of the display panel 10 according to an embodiment of the present disclosure.

As shown in FIG. 2, the display screen 100 has touch sensing and fingerprint recognition functions. Therefore, a display and touch layer 110 with a touch sensor array and a fingerprint recognition layer 120 with a fingerprint recognition array may be stacked and integrated into the display screen 100. And the fingerprint recognition array includes a plurality of fingerprint recognition circuits 101 arranged in a matrix.

The fingerprint recognition driving circuit 102 is located in a row driving device 1021, and serves as a component sub-circuit of the row driving device 1021 to drive a single fingerprint recognition circuit or selectively read out a sensing value in a single fingerprint recognition circuit 101. A column sensing driving device 1022 is used to receive the sensed value.

The display panel 10 includes, optionally, a switch circuit 112_1 and a switch circuit 112_2. The switch circuit 112_1 and the switch circuit 112_2 may be composed of multiplexers and/or switches, and are used to select to transmit a control signal to the fingerprint recognition circuit 101 in the fingerprint recognition layer 120, or to transmit a sensing signal from the fingerprint recognition circuit 101 to a target receiver circuit in the column sensing driving device 1022.

The display panel 10 may further include one or more reading circuits for reading fingerprint sensing signals, one or more analog-to-digital converters (ADCs), and one or more data processing circuits. The reading circuits are used to receive sensing signals of the display screen 100 and output analog sensing data. The ADCs coupled to the reading circuits are used to receive and convert the analog sensing data into digital sensing data. The data processing circuits coupled to the ADCs are used to receive and process the digital sensing data and provide the processed digital sensing data to a processor, the display and touch control circuit, or the fingerprint recognition control circuit.

Figure 3:
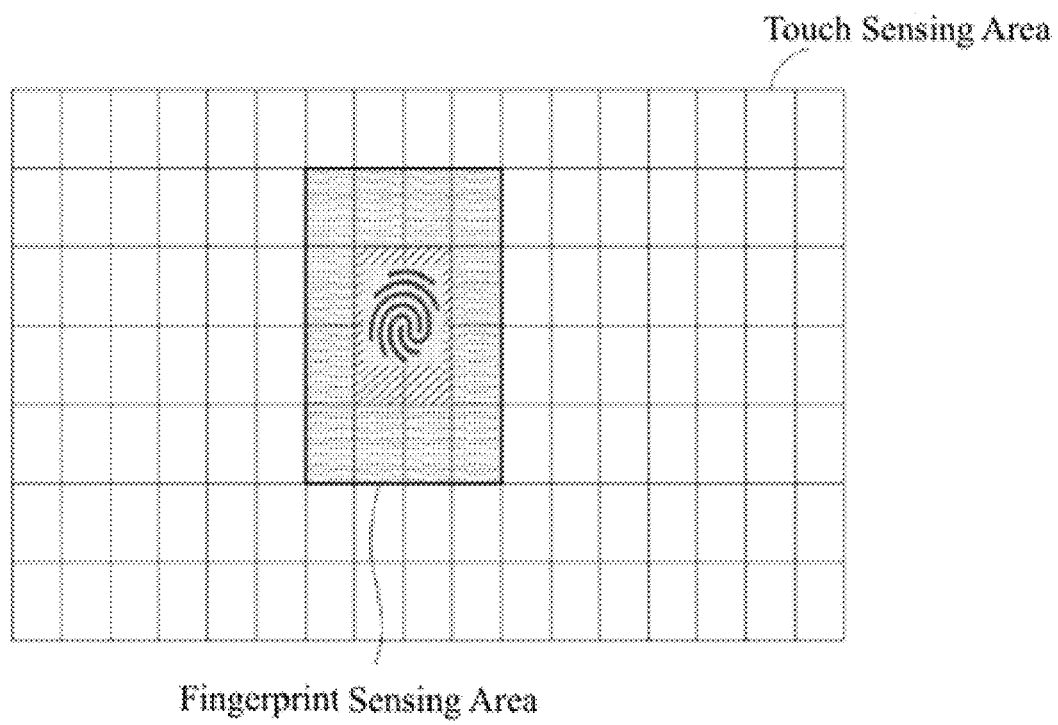
FIG. 3 shows a schematic diagram of a fingerprint sensing area and a touch sensing panel of a display device according to an embodiment of the present disclosure.

FIG. 3 shows a schematic diagram of a fingerprint sensing area and a touch sensing area of the display panel 10 according to an embodiment of the present disclosure.

As shown in FIG. 3, the touch sensing area may cover the entire display area in the display screen 100. The fingerprint sensing area may only cover a portion of the display area in the display screen 100. When the display device is used for fingerprint recognition, and when a finger is pressed on the fingerprint sensing area, the fingerprint recognition driving circuit will drive the fingerprint recognition circuit in the fingerprint recognition layer 120 to sense the fingerprint. Optionally, the fingerprint sensing area and the touch sensing area have an overlapping area. It should be obvious to those skilled in the art that the fingerprint sensing area may also cover the entire display area in the display screen 100.

Since the fingerprint sensing area and the touch sensing area have an overlapping area, the fingerprint recognition operation and the touch sensing operation may interfere with each other.

Figure 4:
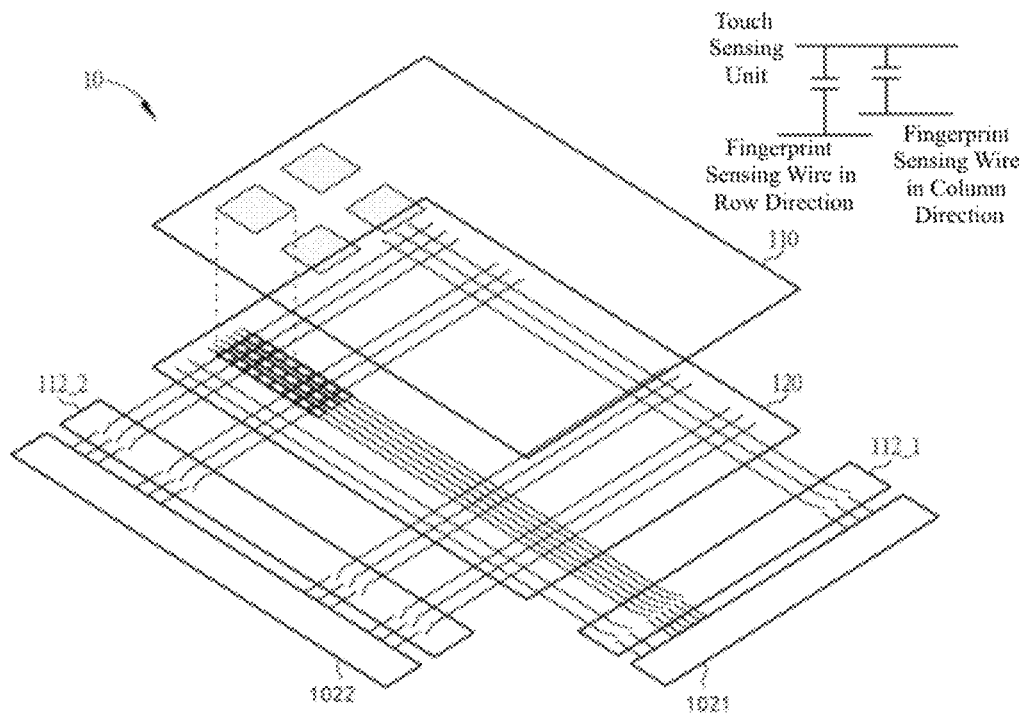
FIG. 4 shows a three-dimensional view of a display panel according to an embodiment of the present disclosure.

FIG. 4 shows a three-dimensional view of the display panel 10 according to an embodiment of the present disclosure.

Referring to FIG. 4, the display and touch layer 110 includes a touch sensing array, where the touch sensing array has a plurality of touch sensing units and a plurality of wires. The display and touch circuit may transmit display and touch driving signals to the touch sensing units, and correspondingly, receive touch sensing signals to determine a touch behavior. A touch driving signal may be a periodic signal, which may have any type of pulse, such as a sine wave, a square wave, a triangle wave, a trapezoidal wave, or the like. Accordingly, a touch sensing signal may also be a corresponding periodic signal, which is used to carry touch sensing information.

The fingerprint recognition layer 120 includes a fingerprint recognition array composed of a plurality of fingerprint recognition circuits and a plurality of wires. Each fingerprint recognition circuit may include several circuit components, which are respectively connected to each other by wires in a row direction and a column direction. Wires in the row direction are connected to the row driving device 1021 and wires in the column direction are connected to the column sensing driving device 1022. These wires may include several control signal lines for transmitting control signals, several voltage source lines for transmitting power supply voltage, and several sensing lines for transmitting fingerprint recognition signals.

As shown in FIG. 4, the display touch layer 110 and the fingerprint recognition layer 120 are different layers but close to each other, resulting in a coupling capacitance that cannot be ignored between each wire connecting the touch sensing units and each wire connecting the fingerprint sensing units. Therefore, when display and touch driving signals are transmitted to the touch sensing units, the coupling capacitance will interfere with the display and touch driving signals or corresponding data signals/sensing signals, resulting in inaccurate voltages on the control signal lines, the data lines, the voltage source lines and/or the sensing lines, and thus a capacitive load that cannot be ignored is generated during the display and touch operation. That is, the coupling capacitance between the display touch layer 110 and the fingerprint recognition layer 120 affects the display and touch operation.

In FIG. 4, the touch layer 110 is an upper layer superimposed on the fingerprint recognition layer 120. However, in another embodiment, the fingerprint recognition layer may be set as the upper layer and the touch sensing layer may be set as the lower layer. Alternatively, the touch sensing units and/or the fingerprint recognition circuits may also be arranged in a multilayer structure. The present disclosure is not limited thereto.

To this end, the present disclosure proposes a fingerprint recognition driving method for a display panel to eliminate or reduce interference between the display and touch operation and the fingerprint recognition operation. The display panel includes a fingerprint recognition circuit, a fingerprint recognition driving circuit, and a controller. The fingerprint recognition driving circuit is used to provide a fingerprint recognition driving signal to the fingerprint recognition circuit. The fingerprint recognition driving method includes: periodically arranging, by the controller, time periods for display and touch in the case that the controller does not receive a fingerprint recognition start signal; periodically arranging, by the controller, time periods for display and touch and time periods for fingerprint recognition at intervals in the case that the controller receives the fingerprint recognition start signal; generating, by the controller, a first fingerprint recognition reset signal during at least one time period for display and touch, and the fingerprint recognition driving circuit being reset under the control of the first fingerprint recognition reset signal.

The fingerprint recognition driving circuit according to the embodiment of the present disclosure is reset under the control of the first fingerprint recognition reset signal even though during time periods for display and touch, so that there are still voltages output on the wires connecting the fingerprint sensing units during the time periods when the display screen is used for display and touch, which reduces the capacitive load generated during the display and touch operation, thereby reducing interference of the fingerprint sensing layer on display and touch signals, and improving the accuracy of the display and touch signals.

Figure 5:
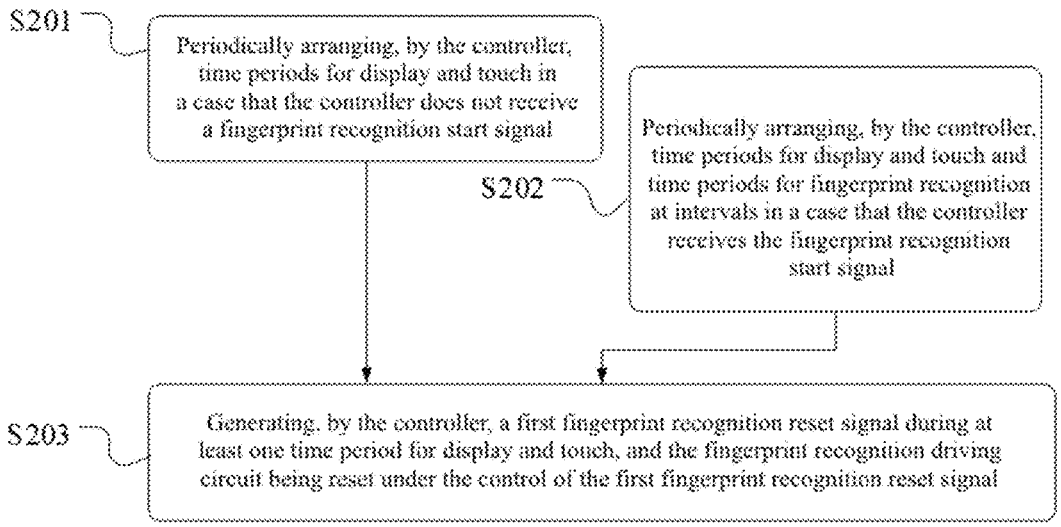
FIG. 5 is a flowchart of a fingerprint recognition driving method for a display panel according to an embodiment of the present disclosure.

FIG. 5 is a flowchart of a fingerprint recognition driving method 200 for a display panel according to an embodiment of the present disclosure.

Referring to FIG. 5, the fingerprint recognition driving method for a display panel 10 according to an embodiment of the present disclosure includes steps S201 to S203. The display panel includes a fingerprint recognition circuit, a fingerprint recognition driving circuit, and a controller, and the fingerprint recognition driving circuit is used to provide a fingerprint recognition driving signal to the fingerprint recognition circuit.

In step S201, the controller periodically arranges time periods for display and touch in the case that the controller does not receive a fingerprint recognition start signal.

In step S202, the controller periodically arranges time periods for display and touch and time periods for fingerprint recognition at intervals in the case that the controller receives the fingerprint recognition start signal.

In step S202, the controller generates a first fingerprint recognition reset signal during at least one time period for display and touch, and the fingerprint recognition driving circuit is reset under the control of the first fingerprint recognition reset signal.

Figure 6:
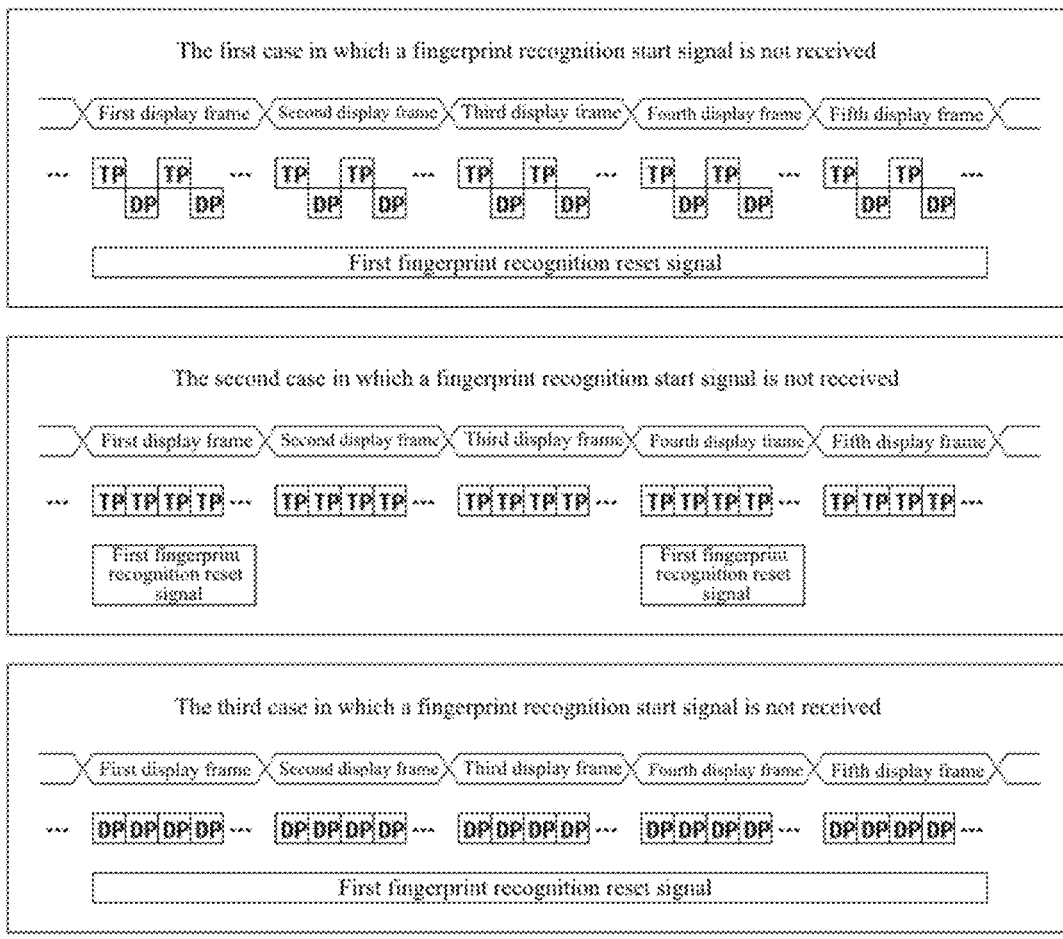
FIG. 6 is a schematic diagram of a case in which a fingerprint recognition start signal is not received according to an embodiment of the present disclosure.

FIG. 6 is a schematic diagram of a case in which a fingerprint recognition start signal is not received according to an embodiment of the present disclosure. Step S201 is described below with reference to FIG. 6.

As shown in FIG. 6, a time period for display and touch is a time period during which the display panel 10 performs the display driving operation, the touch sensing operation, or a combination thereof. In step S201, in the case that the controller does not receive the fingerprint recognition start signal, the controller periodically arranges time periods for display and touch.

An example of a first case in which the controller does not receive the fingerprint recognition start signal is shown in FIG. 6. In the example of the first case, a terminal including the display panel 10 is being used by high frequency. At this time, the display panel 10 refreshes display content according to touch operations during time periods corresponding to a first display frame to a fifth display frame, and no fingerprint recognition operation is required. In the first case, the display panel 10 performs both the display driving operation and the touch sensing operation. It should be obvious to those skilled in the art that although FIG. 6 uses time-division execution of the display driving operation and the touch sensing operation as an example, the display panel 10 may also perform the display driving operation and the touch sensing operation at the same time, and the present disclosure is not limited thereto.

An example of a second case in which the controller does not receive the fingerprint recognition start signal is further shown in FIG. 6. In the example of the second case, the terminal including the display panel 10 is in a case where only display driving is performed and no fingerprint recognition operation is required. For example, the terminal including the display panel 10 may be in a state of playing video. In the second case, the display panel 10 only performs the display driving operation.

An example of a third case in which the controller does not receive the fingerprint recognition start signal is further shown in FIG. 6. In the example of the third case, the terminal including the display panel 10 is in a case where only the touch sensing operation is performed and no fingerprint recognition operation is required. For example, the terminal including the display panel 10 may be in an idle state until the display screen 110 is waked up by a user's touch. In the third case, the display panel 10 only performs the touch sensing operation.

It should be obvious to those skilled in the art that when the fingerprint recognition start signal is not received, the timing of the display panel 10 may also have other forms, which is not limited in the present disclosure.

Figure 7:
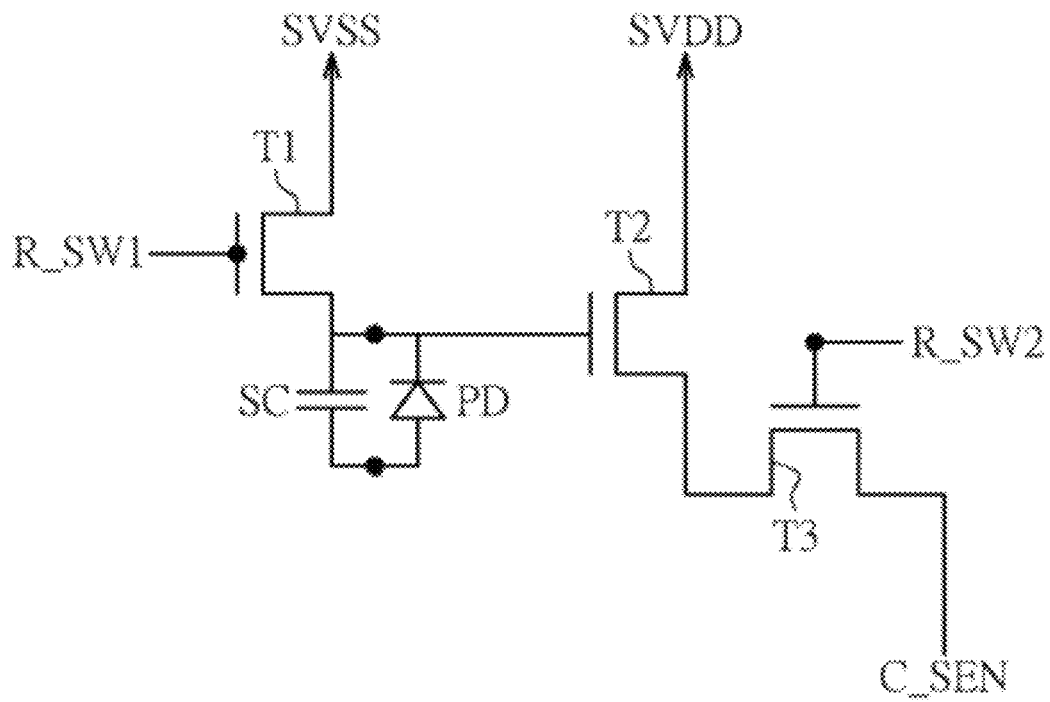
FIG. 7 is a schematic diagram showing a fingerprint recognition circuit according to an embodiment of the present disclosure.
Figure 8:
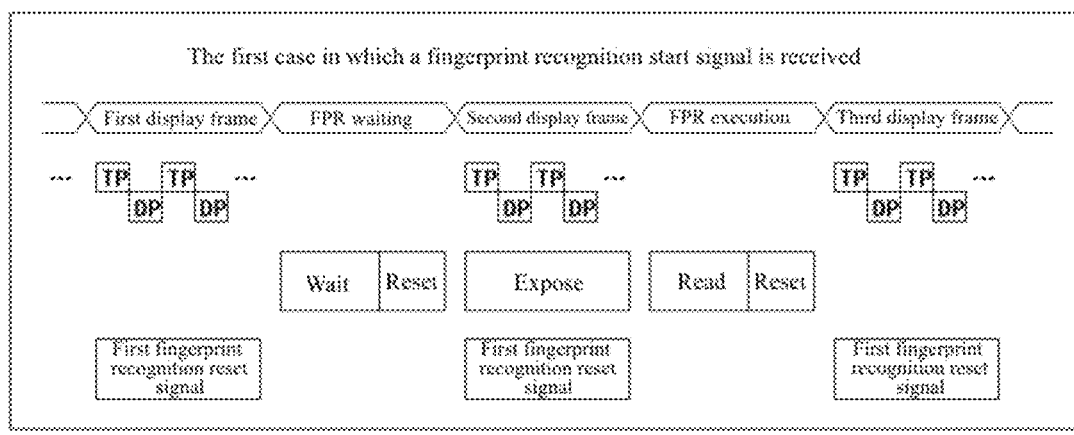
FIG. 8 is a schematic diagram of two cases in which a fingerprint recognition start signal is received according to an embodiment of the present disclosure.
Figure 9:
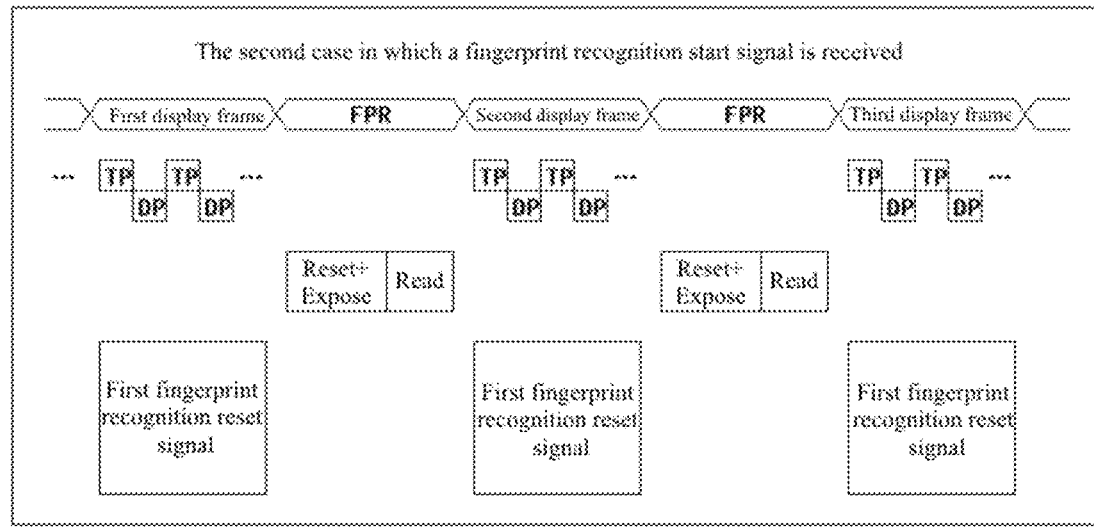
FIG. 9 is a schematic diagram of another two cases in which a fingerprint recognition start signal is received according to an embodiment of the present disclosure.

FIG. 7 is a schematic diagram showing a fingerprint recognition circuit according to an embodiment of the present disclosure. FIG. 8 and FIG. 9 are schematic diagrams of cases in which a fingerprint recognition start signal is received according to an embodiment of the present disclosure. Step S202 will be described below with reference to FIGS. 7-9. In step S202, in the case that the controller receives the fingerprint recognition start signal, the controller periodically arranges time periods for display and touch and time periods for fingerprint recognition at intervals.

Take the fingerprint recognition circuit shown in FIG. 7 as an example for further description. The fingerprint recognition circuit shown in FIG. 7 is an optical fingerprint sensor, which includes an optical component PD, a storage capacitor SC, and three transistors T1 to T3. The fingerprint recognition circuit receives a first power supply voltage through a first power supply line SVSS, and receives a second power supply voltage through a second power supply line SVDD. The first power supply voltage and the second power supply voltage may be a negative power supply voltage, a ground voltage, or positive power supply voltage, respectively, depending on different circuit designs, which is not limited herein in this disclosure. Control signals may be transmitted to the fingerprint recognition circuit through signal lines R_SW1 and R_SW2, respectively, so that the fingerprint recognition circuit may output a sensing signal through a sensing line C_SEN. For example, the row driving device 1021 in FIG. 1B transmits a control signal for driving a row of fingerprint recognition circuits to the fingerprint recognition circuits through the signal line R_SW1. The signal line R_SW1 is used to reset charges in the storage capacitor SC, and the signal line R_SW2 is used to select to read out the charges in the storage capacitor SC. The column sensing driving device 1022 is used to control the signal line R_SW2 to select to read out the charges in the storage capacitor SC. FIG. 2C is only an example of the fingerprint recognition circuit. In another embodiment, the fingerprint recognition circuit may include a photoelectric component PD, a storage capacitor SC, and two transistors T1 and T2, so that the circuit structure is more simplified. The present disclosure is not limited thereto.

As shown in FIG. 7, the transistor T1 has a gate terminal, a first terminal, and a second terminal, where the gate terminal is coupled to the control signal line RSW1 to receive a reset signal, the first terminal is coupled to the first power supply line SVSS, and the second terminal is coupled to the photoelectric component PD and the storage capacitor SC. It should be noted that the first terminal of the transistor T1 may be one of the drain terminal and the source terminal, and the second terminal of the transistor T1 may be the other, which may be determined according to a current direction of the transistor T1. The transistor T2 has a gate terminal, a first terminal, and a second terminal, where the gate terminal is coupled to the second terminal of the transistor T1, the first terminal is coupled to the second power supply line SVDD, and the second terminal is coupled to the transistor T3. It should be noted that the first terminal of the transistor T2 may be one of the drain terminal and the source terminal, and the second terminal of the transistor T2 may be the other, which may be determined according to a current direction of the transistor T2. The transistor T3 has a gate terminal, a first terminal, and a second terminal, where the gate terminal is coupled to the control signal line RSW2 to receive a selection signal, the first terminal is coupled to the second terminal of the transistor T2, and the second terminal is coupled to the sensing line C_SEN. It should be noted that the first terminal of the transistor T3 may be one of the drain terminal and the source terminal, and the second terminal of the transistor T3 may be the other, which may be determined according to a current direction of the transistor T3.

The photoelectric component in FIG. 7 is used to sense light and convert the sensed light intensity into an electronic signal. This process is called exposure. Before the exposure, the fingerprint recognition driving circuit 102 controls the fingerprint recognition circuit 101 to perform a reset operation. In the reset operation, the transistor T1 resets the charges in the storage capacitor SC. During the exposure, the electronic signal will flow to the storage capacitor SC and be stored in the storage capacitor SC. After the exposure, the fingerprint recognition circuit performs a readout operation, and the readout operation will transfer the electronic signal stored in the storage capacitor SC to the sensing line C_SEN, which will be read by a subsequent circuit. The reset operation and the readout operation may be performed column by column or row by row.

A time period for fingerprint recognition is a time period during which the display panel 10 performs fingerprint recognition. A time period for fingerprint recognition includes a fingerprint recognition execution time period for fingerprint recognition and a fingerprint recognition waiting time period for fingerprint recognition. During the fingerprint recognition execution time period for fingerprint recognition, the fingerprint recognition circuit may perform the readout operation, or perform the readout operation and perform the reset operation after reading out fingerprint sensing data. During the fingerprint recognition waiting time period for fingerprint recognition, the fingerprint recognition circuit may perform one or a combination of the reset operation, the exposure operation, or a waiting operation. During the fingerprint recognition execution time period and the fingerprint recognition waiting time period, the fingerprint recognition circuit may also perform more or fewer operations, which is not limited herein.

FIG. 8 and FIG. 9 show two cases in which time periods for fingerprint recognition are arranged between two consecutive display frames.

Referring to FIG. 8, an example of a first case in which the controller receives the fingerprint recognition start signal is to arrange time periods for fingerprint recognition between two consecutive display frames, and each time period for fingerprint recognition may be either the fingerprint recognition waiting time period for fingerprint recognition or the fingerprint recognition execution time period for fingerprint recognition. For example, during the fingerprint recognition waiting time period (i.e., an FPR waiting time period between a first display frame and a second display frame), each row of fingerprint recognition circuits remains idle until the fingerprint recognition driving circuit 102 instructs them to perform the reset operation (e.g., a voltage on R_SW1 exceeds a threshold voltage of the transistor T1), and the charges in the storage capacitor SC are reset after the instruction is obtained. Next, the fingerprint recognition circuits are exposed during the second display frame. Then, the readout operation of fingerprint sensing signals is performed during the fingerprint recognition execution time period (i.e., the FPR execution period between the second display frame and the third display frame), and the fingerprint recognition circuits are reset after the readout of the fingerprint sensing signals. Of course, after the readout of the fingerprint sensing signals, the fingerprint recognition circuits may not be reset until the controller receives the next fingerprint recognition start signal. The present disclosure is not limited thereto.

Referring to FIG. 9, an example of a second case in which the controller receives the fingerprint recognition start signal is to arrange time periods for fingerprint recognition between two consecutive display frames, and each time period for fingerprint recognition includes both the fingerprint recognition waiting time period for fingerprint recognition and the fingerprint recognition execution time period for fingerprint recognition, that is, a complete process of fingerprint recognition is completed within a single time period arranged for fingerprint recognition.

It should be obvious to those skilled in the art that the fingerprint recognition circuit may also perform more or fewer operations, or perform the respective waiting operation, reset operation, exposure operation, and readout operation in other timings.

Step S203 will be further described below with reference to FIG. 7 and FIG. 10 to FIG. 13. In step S203, the controller generates a first fingerprint recognition reset signal in at least one time period for display and touch, and the fingerprint recognition driving circuit is reset under the control of the first fingerprint recognition reset signal.

Continuing to refer to FIG. 7, the control signal lines R_SW1 and R_SW2, and the sensing line C_SEN connected to the fingerprint recognition circuit are all arranged in the fingerprint sensing layer 120. Therefore, during a time period for touch and display, if voltages on the control signal lines R_SW1 and R_SW2 and the sensing line C_SEN are floating, interference will be caused to driving signals and sensing signals for display and touch. In order to reduce the interference, as shown in FIGS. 8 and 9, the controller generates the first fingerprint recognition reset signal during time periods for display and touch, and the fingerprint recognition driving circuit is reset under the control of the first fingerprint recognition reset signal.

Figure 10:
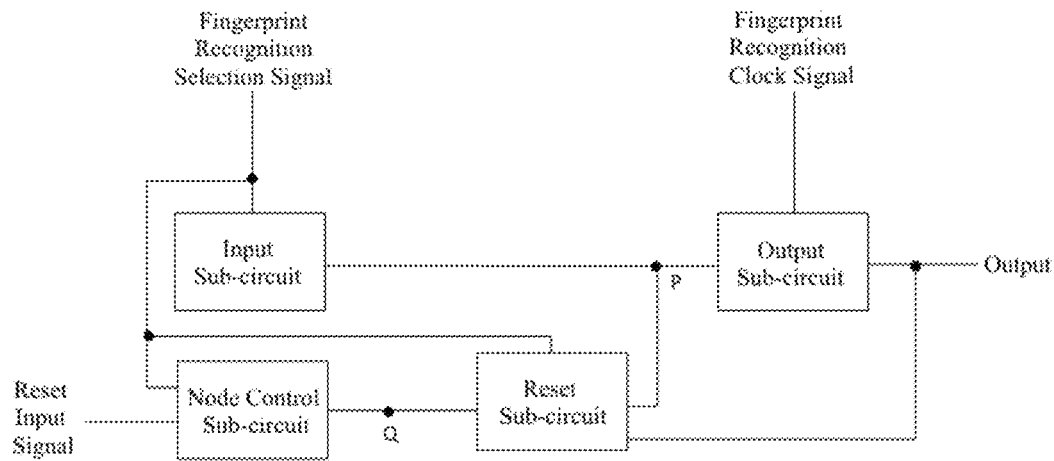
FIG. 10 shows a fingerprint recognition driving circuit according to an embodiment of the present disclosure.

FIG. 10 shows a fingerprint recognition driving circuit according to an embodiment of the present disclosure.

The fingerprint recognition driving circuit shown in FIG. 10 includes an input sub-circuit, an output sub-circuit, a node control sub-circuit, and a reset sub-circuit. The fingerprint recognition driving circuit shown in FIG. 10 may be located in the row driving device 1021, and its output is used to output, to R_SW1 in the fingerprint recognition circuit in FIG. 7, a control signal for resetting the fingerprint recognition circuit. The fingerprint recognition driving circuit shown in FIG. 10 may also be located in the column sensing driving device 1022, and its output is used to output, to R_SW2 in the fingerprint recognition circuit in FIG. 7, a control signal for selecting to readout the storage capacitor SC in the fingerprint recognition circuit.

For example, in the fingerprint recognition driving circuit shown in FIG. 10, an input terminal of the input sub-circuit receives a fingerprint recognition selection signal, and its output terminal is connected to a first node P, and make the first node P at an effective level under the control of the fingerprint recognition selection signal.

A first input terminal of the output sub-circuit is connected to the first node P, its second input terminal receives a fingerprint recognition clock signal, and its output terminal serves as the output terminal of the fingerprint recognition driving circuit, and outputs the fingerprint recognition clock signal at the output terminal of the fingerprint recognition driving circuit under the control of the first node P.

A first input terminal of the node control sub-circuit receives the fingerprint recognition selection signal, its second input terminal receives a reset input signal, and its output terminal is connected to a reset node Q, makes the reset node Q at an ineffective level under the control of the fingerprint recognition selection signal, and makes the reset node Q at an effective level under the control of the reset input signal, where an effective signal of the fingerprint recognition selection signal and an effective signal of the reset signal do not overlap with each other.

A first input terminal of the reset sub-circuit receives the fingerprint recognition selection signal, its second input terminal is connected to the reset node Q, its first output terminal is connected to the first node, and its second output terminal is connected to the output terminal of the fingerprint recognition driving circuit, such that the first node is reset under the control of the reset input signal, and the output terminal is reset under the control of the reset node Q Optionally, during at least one time period for display and touch, the first fingerprint recognition reset signal is provided by the reset input signal. At this time, the first fingerprint recognition reset signal is input to the node control sub-circuit, so that the reset node Q is at an effective level, thereby resetting the output terminal.

Optionally, referring to FIG. 8, in step S203, generating the first fingerprint recognition reset signal during at least one time period for display and touch includes: generating the first fingerprint recognition reset signal in each time period for display and touch; or selecting a time period for display and touch in a plurality of consecutive time periods for display and touch, and generating the first fingerprint recognition reset signal in the selected time period for display and touch.

If the controller does not receive the fingerprint recognition start signal, in order to save power (e.g., in the case of standby), the first fingerprint recognition reset signal may be generated only during a part of time periods for display and touch.

Optionally, the first fingerprint recognition reset signal includes at least one reset pulse, and a time interval between adjacent reset pulses in the at least one reset pulse is less than a preset time interval, where the preset time interval is determined according to a discharge time of the fingerprint recognition driving circuit.

As shown in FIG. 10, if the fingerprint recognition driving circuit does not receive a reset input signal for a long time, the reset node Q will not be able to maintain a high level, and the output terminal will be in a floating state. Therefore, a time interval between adjacent reset pulses in the first fingerprint recognition reset signal should be less than a time period during which the reset node Q is discharged, so as to ensure that there is still voltage output on the output terminal.

Based on this, the output terminal of the fingerprint recognition driving circuit after reset is no longer floating, so that there is still voltage output on wires connecting the fingerprint sensor units during time periods when the display screen is used for display and touch, thereby reducing the capacitive load generated during the display and touch operation.

Figure 11:
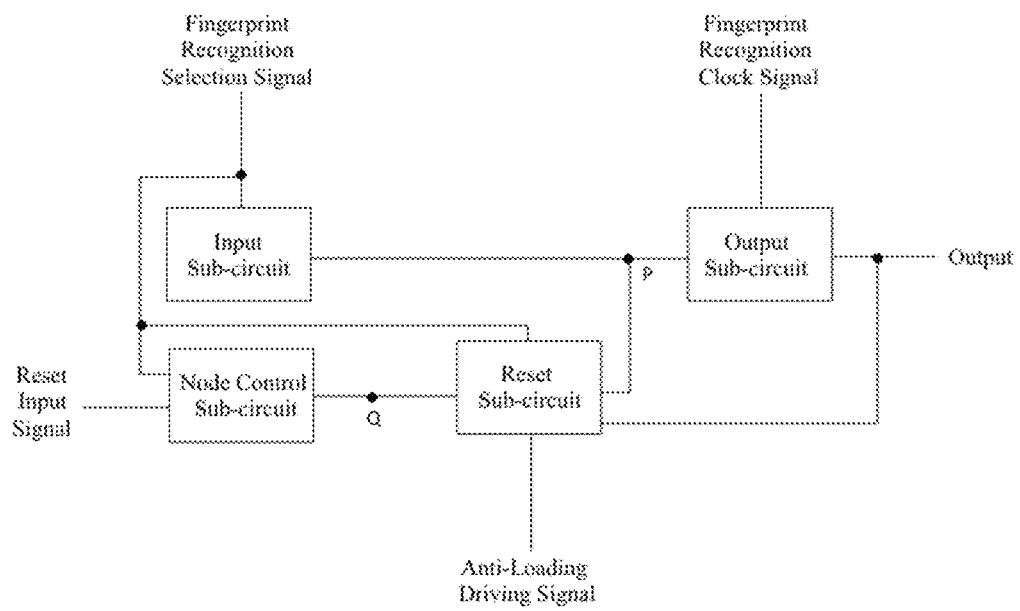
FIG. 11 shows another fingerprint recognition driving circuit according to an embodiment of the present disclosure.

FIG. 11 shows another fingerprint recognition driving circuit according to an embodiment of the present disclosure.

Compared with the fingerprint recognition driving circuit shown in FIG. 10, the reset sub-circuit of the fingerprint recognition driving circuit shown in FIG. 11 further has a third input terminal, which is used to receive an Anti-Loading Driving (ALD) signal. Therefore, during the at least one time period for display and touch, based on the first fingerprint recognition reset signal provided by the reset input signal, the reset sub-circuit resets the output terminal under the control of the reset node Q, and outputs the anti-loading driving signal at the output terminal.

It is worth noting that the purpose of the anti-loading driving signal is to eliminate or reduce the capacitive load generated during the display and touch operation. Preferably, the anti-loading driving signal may be designed to be exactly the same as a touch driving signal transmitted to a touch sensing pad.

For example, during the time period for display and touch, the anti-loading driving signal synchronized with the touch driving signal is provided in at least one of the input signals for the fingerprint recognition driving circuit, and the fingerprint recognition driving circuit outputs the anti-loading driving signal at its output terminal to the input terminal (e.g., R_SW1 or R_SW2) of the fingerprint recognition circuit.

As another example, the anti-loading driving signal may also be applied directly to the SVSS line and the SVDD line in FIG. 7, and may be used as an input signal of the fingerprint recognition circuit. That is, in the time period for display and touch, the anti-loading driving signal synchronized with the touch driving signal is provided in at least one of the input signals for the fingerprint recognition circuit. This disclosure is not limited thereto.

Thus, in the time period for display and touch, the anti-loading driving signal synchronized with the touch driving signal is provided in at least one of the input signals for the fingerprint recognition circuit.

As another example, the anti-loading driving signal may also be applied directly to the output terminal (e.g., the sensing line C_SEN) of the fingerprint recognition circuit. That is, in the time period for display and touch, the anti-loading driving signal synchronized with the touch driving signal is provided in the input signals for the fingerprint recognition circuit.

Figure 12:
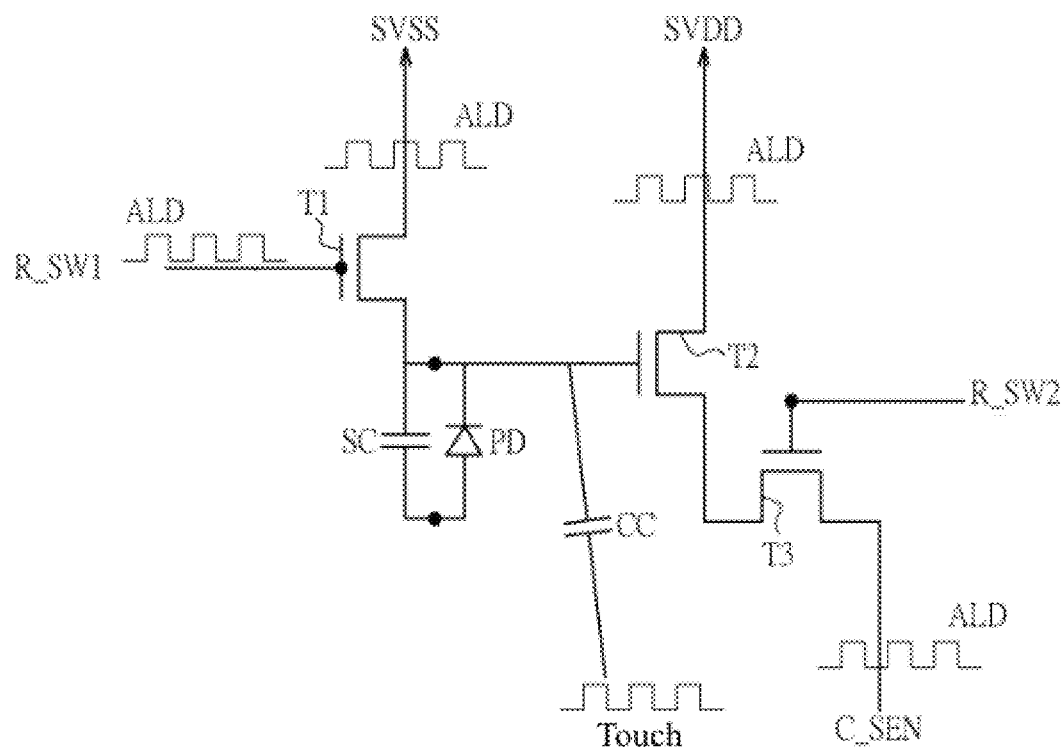
FIG. 12 shows a schematic diagram of applying an anti-loading driving signal on a fingerprint recognition circuit according to an embodiment of the present disclosure.

FIG. 12 shows a schematic diagram of applying an anti-loading driving signal on a fingerprint recognition circuit according to an embodiment of the present disclosure.

When the touch driving signal is switched up and down, if the anti-loading driving signal is exactly the same as the touch driving signal, a cross-voltage of a coupling capacitor CC will remain constant, that is, the coupling capacitor CC will not be charged and discharged, and thus will not interfere with the touch driving signal. Since each wire connected to the fingerprint recognition circuit may form a coupling capacitor with a wire arranged in the display and touch layer 110, FIG. 12 is only an example of the position where the coupling capacitor CC is formed, and the present disclosure is not limited thereto.

The touch driving signal may be a periodic signal with a plurality of pulses. Therefore, the anti-loading driving signal may also be a modulated signal with a plurality of pulses, and frequency, phase, and amplitude of the pulses are substantially the same as those of the pulses of the touch driving signal. Since the touch driving signal may include any type of pulses, such as a sine wave, a square wave, a triangle wave, a trapezoidal wave, and the like, the anti-loading driving signal may be modulated to include the same or similar type of pulses.

It is worth noting that the anti-loading driving signal may be the same or not exactly the same as the touch signal (such as a touch driving signal or a touch sensing signal). For example, in some embodiments, the amplitude of the anti-loading driving signal may be slightly smaller than the amplitude of the touch driving signal, and the frequency and phase thereof are approximately the same. Alternatively or additionally, the phase of the anti-loading driving signal may have a slight offset from the phase of the touch driving signal, and the frequency thereof may be approximately the same. If the similarity between the anti-loading driving signal and the touch signal is high, the efficiency of capacitive load reduction may be improved.

In some embodiments, for different connecting wires used for a same row of fingerprint recognition circuits and/or different connecting wires used for a same column of fingerprint recognition circuits, the anti-loading driving signal may be implemented in different ways, so as to achieve flexibility of the anti-loading driving operation.

Thus, the embodiments of the present disclosure provide a fingerprint recognition driving method for a display panel. The display panel includes a fingerprint recognition circuit, a fingerprint recognition driving circuit, and a controller, the fingerprint recognition driving circuit being used to provide a fingerprint recognition driving signal to the fingerprint recognition circuit. One layer of a touch sensing layer and a fingerprint sensing layer may be superimposed on the other layer, and the two layers are close to each other, resulting in a huge capacitive load caused by coupling capacitance between the touch sensing layer and the fingerprint sensing layer. During a period for display and touch operation, wires of the fingerprint sensing circuit will form a capacitive load on the display and touch circuit. In order to eliminate or reduce the capacitive load, the fingerprint recognition driving method for a display panel of the embodiments of the present disclosure may be used to control voltages on the fingerprint recognition circuit even though during a time period for display and touch (for example, an anti-loading driving signal is applied to wires of fingerprint sensing pixels to drive the wires, where a frequency, phase and/or amplitude of the anti-loading driving signal is substantially the same as a frequency, phase and/or amplitude of a touch signal, respectively), thereby reducing interference to display and touch signals by the fingerprint sensing layer, and improving the accuracy of the display and touch signals.

Optionally, since a time period for fingerprint recognition and a time period for display and touch are close, during the time period for fingerprint recognition, a fingerprint recognition reset signal may also be generated to control reset of the fingerprint recognition driving circuit, to avoid possible interference to display and touch signals in the adjacent time period for display and touch.

The fingerprint recognition reset signal generated during time periods for fingerprint recognition will be described below with reference to FIGS. 13 to 18.

Optionally, the time periods for fingerprint recognition are a first number of the time period, the first number of time periods for fingerprint recognition includes a second number of fingerprint recognition execution time periods for fingerprint recognition and a third number of fingerprint recognition waiting time periods for fingerprint recognition. The fingerprint recognition driving method 20 described above further includes step S204 or step S205.

In step S204, the controller generates a periodic second fingerprint recognition reset signal during the second number of fingerprint recognition execution time periods for fingerprint recognition, and the fingerprint recognition driving circuit is reset under the control of the second fingerprint recognition reset signal, where the longest interval between the second fingerprint recognition reset signal and the first fingerprint recognition reset signal is less than a preset time interval.

In step S205, the controller generates a periodic second fingerprint recognition reset signal during the second number of fingerprint recognition execution time periods for fingerprint recognition, and the fingerprint recognition driving circuit is reset under the control of the second fingerprint recognition reset signal; and the controller generates a third fingerprint recognition reset signal during the third number of fingerprint recognition waiting time periods for fingerprint recognition, where a sum of the third number and the second number is less than or equal to the first number; and where the longest interval between any two of the second fingerprint recognition reset signal, the first fingerprint recognition reset signal, and the third fingerprint recognition reset signal is less than the preset time interval.

Optionally, the first fingerprint recognition reset signal includes at least one reset pulse, and a time interval between adjacent reset pulses in the at least one reset pulse is less than the preset time interval, where the preset time interval is determined according to the discharge time of the fingerprint recognition driving circuit.

Optionally, the first fingerprint recognition reset signal includes at least one reset pulse, and the third fingerprint recognition reset signal includes at least one reset pulse. A time interval between adjacent reset pulses in the first fingerprint recognition reset signal and the third fingerprint recognition reset signal may be less than the preset time interval. A time interval between adjacent reset pulses in the first fingerprint recognition reset signal and the second fingerprint recognition reset signal may also be less than the preset time interval. And the preset time interval is determined according to the discharge time of the fingerprint recognition driving circuit.

Optionally, generating the first fingerprint recognition reset signal during at least one time period for display and touch includes: generating the first fingerprint recognition reset signal in each time period for display and touch; or selecting a time period for display and touch in a plurality of consecutive time periods for display and touch, and generating the first fingerprint recognition reset signal in the selected time period for display and touch.

Figure 13:
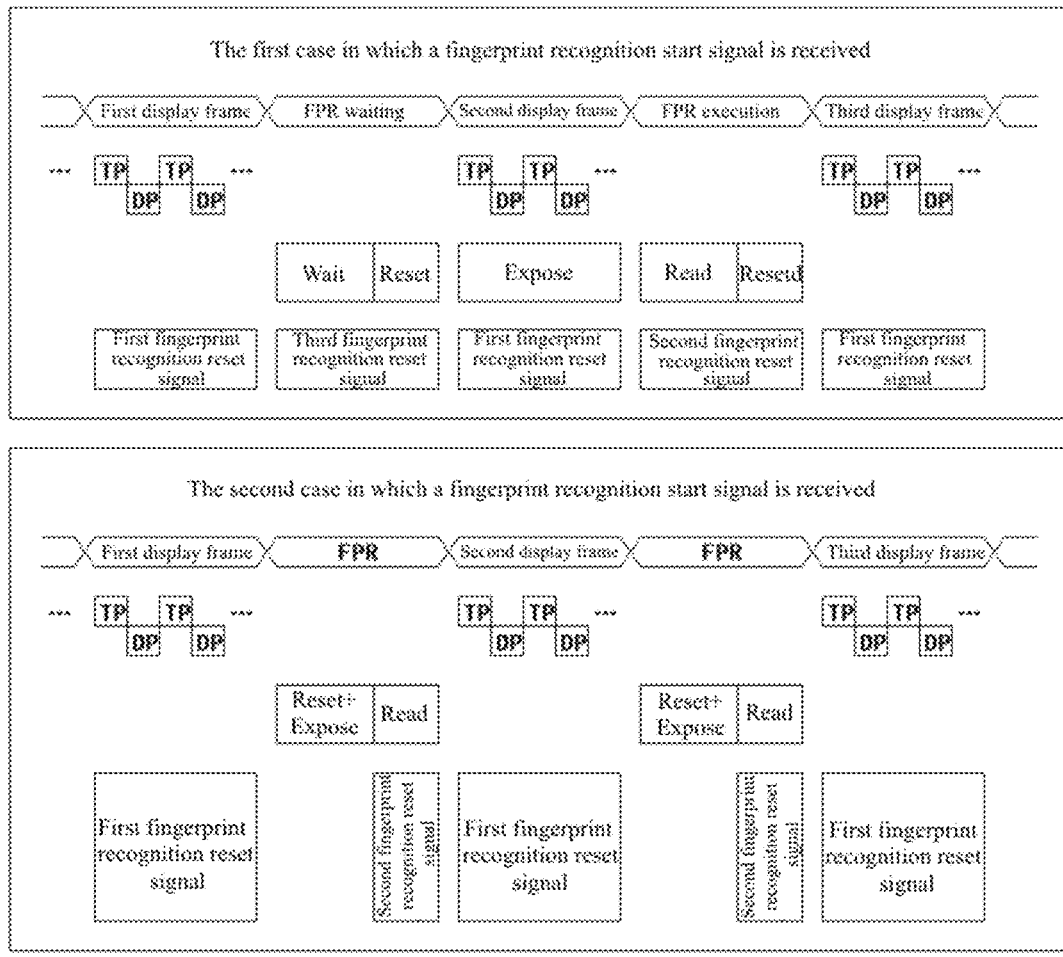
FIG. 13 to FIG. 15 are exemplary schematic diagrams of two cases in which a fingerprint recognition start signal is received according to an embodiment of the present disclosure.
Figure 14:
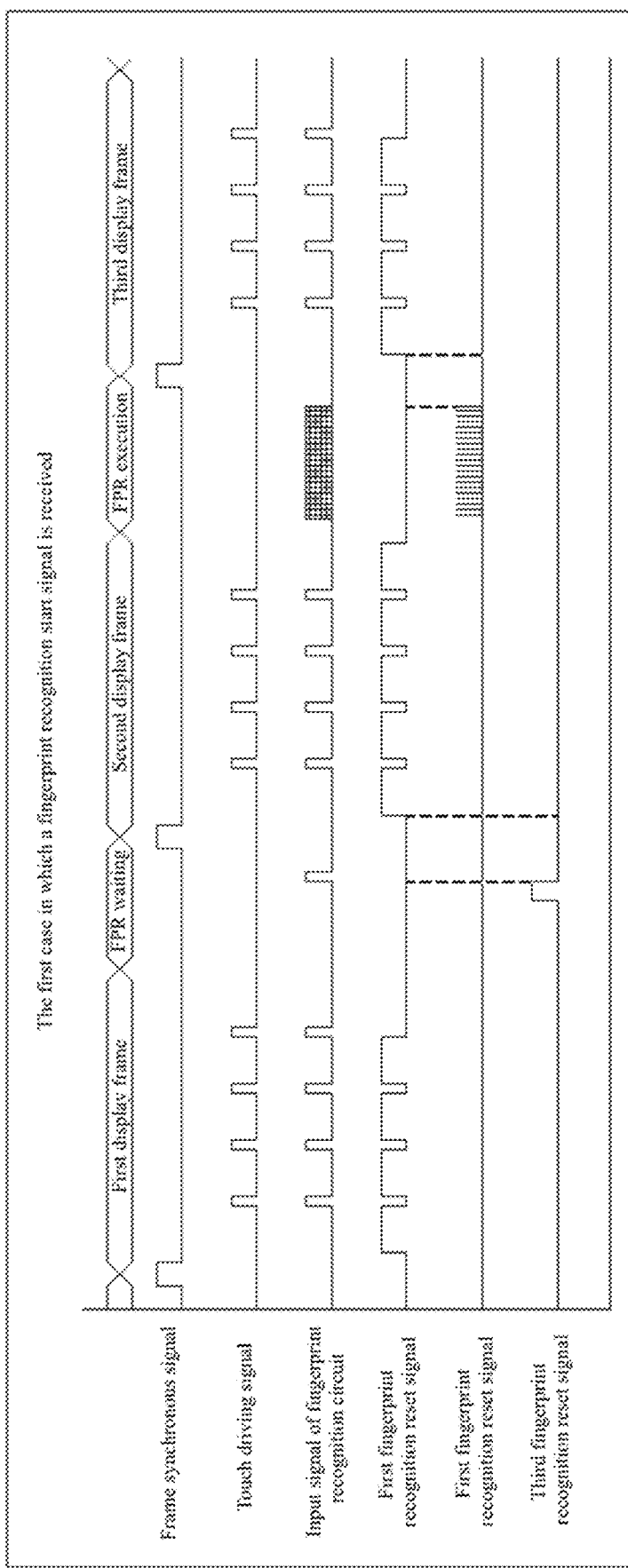
Figure 15:
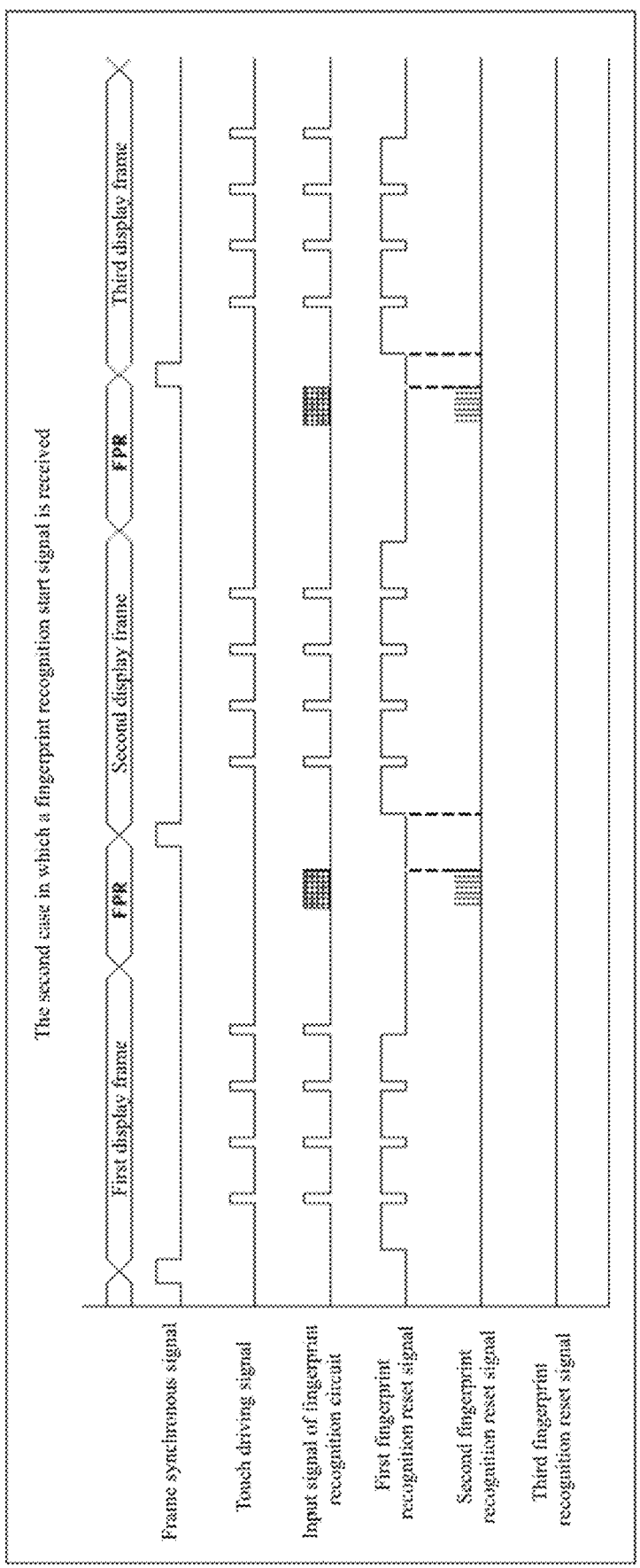

FIGS. 13 to 15 are exemplary schematic diagrams of cases in which a fingerprint recognition start signal is received according to an embodiment of the present disclosure. FIG. 13 shows two cases in which time periods for fingerprint recognition are arranged between two consecutive display frames.

An example of the first case in which the controller receives the fingerprint recognition start signal is to arrange time periods for fingerprint recognition between two consecutive display frames, where a first time period for fingerprint recognition is a fingerprint recognition waiting time period, and a second time period for fingerprint recognition is the fingerprint recognition execution time period. Duration of a time period for fingerprint recognition may be equal to the duration of one display frame, or may be less than the duration of one display frame, which is not limited herein.

Taking the first case of FIG. 14 as an example, before the third display frame, the first number is 2, the second number and the third number are 1, and the sum of the third number and the second number is equal to the first number.

Referring to FIG. 7, FIG. 10, FIG. 11, and FIGS. 13-14, during the fingerprint recognition waiting time period in the first case, because the fingerprint recognition driving circuit has not worked for a long time, the reset node Q in FIG. 10 may become ineffective, which may result in floating voltages on the control signal lines R_SW1 and R_SW2 and the sensing line C_SEN. Then, in the initial time period of the second display frame, the coupling capacitance between the touch sensing layer and the fingerprint sensing layer leads to a huge capacitive load. At this time, a third fingerprint recognition reset signal needs to be applied during the FPR waiting time period, and the third fingerprint recognition reset signal includes at least one reset pulse to reset the fingerprint recognition driving circuit.

Optionally, a time interval (as shown by the areas between the dotted lines in FIG. 14) between the last pulse of the third fingerprint recognition reset signal and the first pulse of the first fingerprint recognition reset signal applied in the second display frame should be less than the preset time interval (the preset time interval is determined according to the discharge time of the fingerprint recognition driving circuit), to ensure that the reset node Q in FIG. 10 or FIG. 11 does not become ineffective during the entire time period of the second display frame.

Optionally, the first fingerprint recognition reset signal includes at least one reset pulse, and a time interval between adjacent reset pulses in the at least one reset pulse is less than the preset time interval, where the preset time interval is determined according to the discharge time of the fingerprint recognition driving circuit.

During the fingerprint recognition execution time period in the first case, the fingerprint recognition driving circuit controls the fingerprint recognition circuit to readout fingerprint sensing data in the storage capacitor SC. At this time, the input signal of the fingerprint recognition circuit is shown in the form of a checkerboard, which indicates that the input signal enables the fingerprint recognition circuit to execute a process from reading to reset. That is, by providing the second fingerprint recognition reset signal to the fingerprint recognition driving circuit, the fingerprint recognition driving circuit resets the corresponding fingerprint recognition circuit according to the second fingerprint recognition reset signal to perform the process from reading to reset.

Since the fingerprint sensing data is read out sequentially in rows, some fingerprint recognition circuits may be in a state of not working for a long time before the third display frame comes. For these fingerprint recognition circuits, their reset nodes Q may become ineffective, which may result in floating voltages on the control signal lines R_SW1 and R_SW2 and the sensing line C_SEN. Then, in the initial period of the third display frame, the coupling capacitance between the touch sensing layer and the fingerprint sensing layer leads to a huge capacitive load. At this time, it is necessary to make the time interval between the last pulse of the second fingerprint recognition reset signal and the first pulse of the first fingerprint recognition reset signal applied in the third display frame (as shown in the areas between the dotted lines in FIG. 14) less than the preset time interval (the preset time interval is determined according to the discharge time of the fingerprint recognition driving circuits), to ensure that the reset node Q in FIG. 10 or FIG. 11 does not become ineffective during the entire time period of the third display frame.

In summary, in the first case, the longest interval between any two of the second fingerprint recognition reset signal, the first fingerprint recognition reset signal, and the third fingerprint recognition reset signal may be less than the preset time interval, to ensure that the reset node Q does not become ineffective during time periods for display and touch, so the output terminal of the fingerprint recognition driving circuit will not be floating, or the fingerprint recognition driving circuit may apply an anti-loading driving signal to ensure the accuracy of the display and touch driving signals.

An example of the second case in which the controller receives the fingerprint recognition start signal is to arrange time periods for fingerprint recognition between two consecutive display frames, where each time period for fingerprint recognition includes both a fingerprint recognition waiting time period for fingerprint recognition and a fingerprint recognition execution time period for fingerprint recognition.

In the second case, the third fingerprint recognition reset signal is not generated. Therefore, taking the second case in FIG. 13 and FIG. 15 as an example, after the third display frame ends, the first number is 3, the second number is 2, the third number is 0, and the sum of the third number and the second number is less than the first number.

In the fingerprint recognition execution time period (i.e., the FPR execution time period) in the second case, the fingerprint recognition driving circuit controls the fingerprint recognition circuit to read out fingerprint sensing data in the storage capacitor SC. At this time, the second fingerprint recognition reset signal controls the fingerprint recognition driving circuit to output a corresponding signal as an input signal of the fingerprint recognition circuit, so that the fingerprint recognition circuit executes the process from reading to reset. Since the fingerprint sensing data is read out sequentially in rows, some fingerprint recognition circuits may be in a state of not working for a long time before the next display frame comes. For these fingerprint recognition circuits, their reset nodes Q may have become ineffective, which may result in floating voltages on the control signal lines R_SW1 and R_SW2 and the sensing line C_SEN. Then, in the initial period of the next display frame, the coupling capacitance between the touch sensing layer and the fingerprint sensing layer leads to a huge capacitive load. At this time, it is necessary to make the time interval between the last pulse of the second fingerprint recognition reset signal and the first pulse of the first fingerprint recognition reset signal applied in the next display frame (as shown in the areas between the dotted lines in FIG. 15) less than the preset time interval (the preset time interval is determined according to the discharge time of the fingerprint recognition driving circuits), to ensure that the reset node Q in FIG. 10 or FIG. 11 does not become ineffective during the entire time period of the third display frame.

In summary, in the second case, the longest interval between the second fingerprint recognition reset signal and the first fingerprint recognition reset signal may be less than the preset time interval, to ensure that the reset node Q does not become ineffective during time periods for display and touch, so the output terminal of the fingerprint recognition driving circuit will not be floating, or the fingerprint recognition driving circuit may apply an anti-loading synchronous driving signal to ensure the accuracy of the display and touch driving signals.

Working states of cascaded fingerprint recognition driving circuits and fingerprint recognition circuits will be described below with reference to FIGS. 16 to 20.

Figure 16:
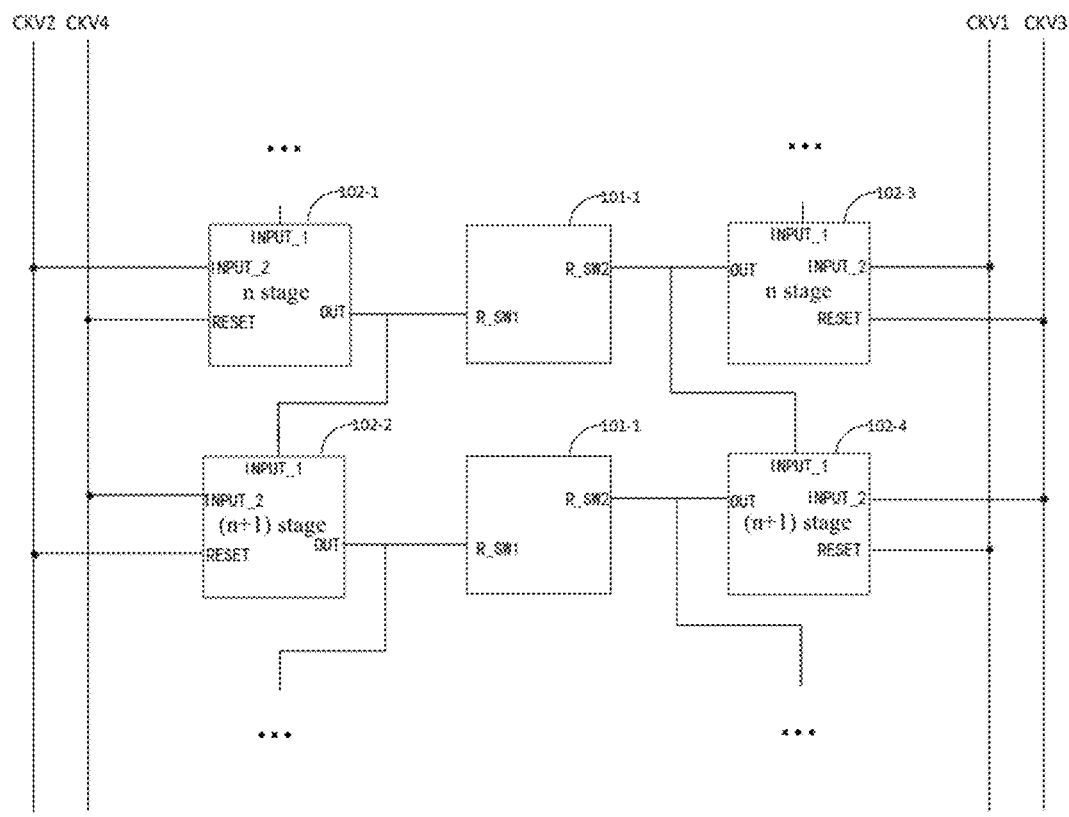
FIG. 16 shows a schematic diagram of cascaded fingerprint recognition driving circuits and fingerprint recognition circuits according to an embodiment of the present disclosure.

FIG. 16 shows a schematic diagram of cascaded fingerprint recognition driving circuits 102 and fingerprint recognition circuits 101 according to an embodiment of the present disclosure.

For each fingerprint recognition driving circuit 102, a first input terminal INPUT_1 of the fingerprint recognition driving circuit receives the fingerprint recognition selection signal, its second input terminal INPUT_2 receives the fingerprint recognition clock signal, and its reset input terminal RESET is connected to the reset input signal.

During the fingerprint recognition execution time period for fingerprint recognition, the controller provides the fingerprint recognition selection signal to the first input terminal INPUT_1 of the fingerprint recognition driving circuit, and the fingerprint recognition driving circuit outputs the fingerprint recognition driving signal at its output terminal OUT under the control of the fingerprint recognition selection signal received at its first input terminal INPUT_1 and the fingerprint recognition clock signal received at its second input terminal INPUT_2, and the controller provides the second fingerprint recognition reset signal by the input reset signal, provides the first fingerprint recognition reset signal by the reset input signal during the at least one time period for display and touch; and/or provides the third fingerprint recognition reset signal by the reset input signal during the fingerprint recognition waiting time period for fingerprint recognition.

Figure 17:
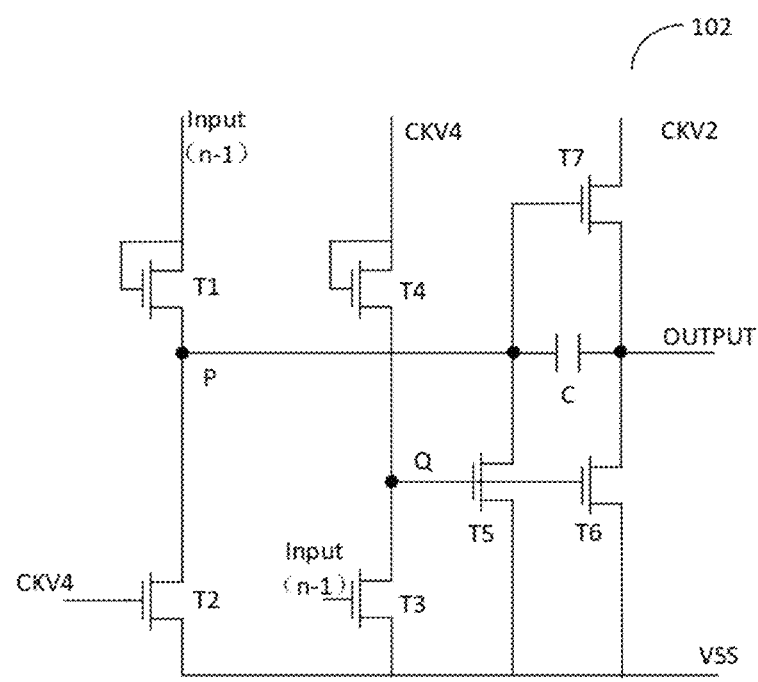
FIG. 17 and FIG. 18 show circuit diagrams of a fingerprint recognition driving circuit according to an embodiment of the present disclosure.

The circuit structure diagrams shown in FIGS. 10 to 11 are different embodiments of the fingerprint recognition driving circuit 102 shown in FIG. 17. In connection with FIGS. 10 to 11, the first input terminal INPUT_1 of the fingerprint recognition driving circuit is the input terminal of its input sub-circuit. The second input terminal INPUT_2 of the fingerprint recognition circuit is the second input terminal of the output sub-circuit. The reset input terminal REST of the fingerprint recognition circuit is the second input terminal of the node control sub-circuit. The output terminal OUT of the fingerprint recognition circuit is the output terminal of the output sub-circuit.

Figure 18:
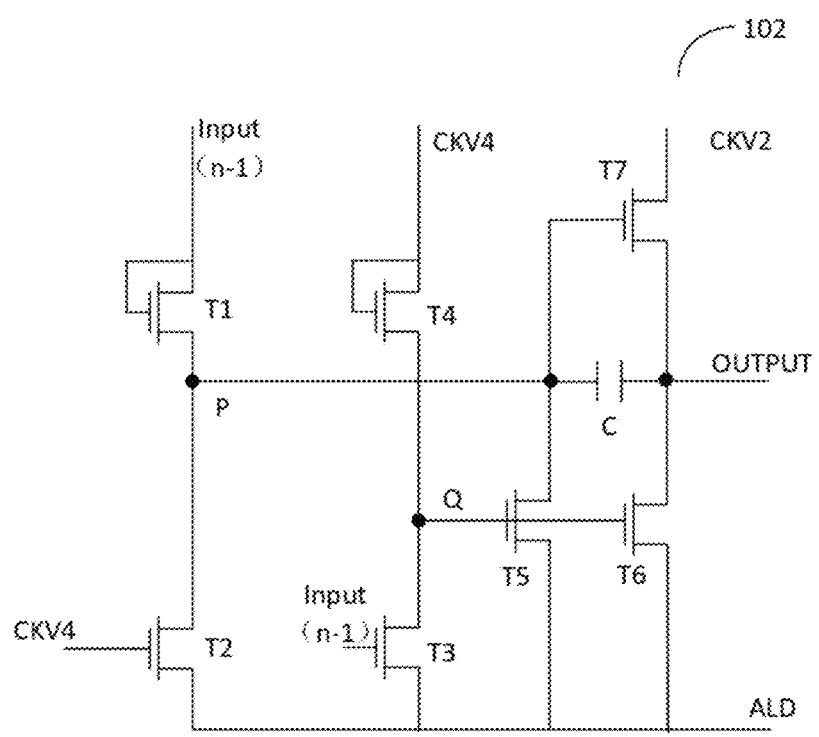

FIGS. 17 and 18 show circuit diagrams of the fingerprint recognition driving circuit 102-1 in FIG. 16, which may also be used as an example of the circuit structure diagrams shown in FIGS. 10-12. The input sub-circuit of the fingerprint recognition driving circuit includes a transistor T1, the output sub-circuit includes a transistor T7, the node control sub-circuit includes a transistor T4 and a transistor T3, and the reset sub-circuit includes a transistor T2 and a transistor T6, where the first node is also identified by P, and the reset node is also identified by Q.

As shown in FIG. 17, when the reset node Q maintains a high level, the transistor T6 is turned on, and the voltage of the output terminal is consistent with VSS, thereby preventing the output terminal from floating.

Furthermore, as shown in FIG. 18, the aforementioned anti-loading synchronous driving signal ALD may be loaded on the VSS line, so that the output terminal may output the anti-loading synchronous driving signal ALD when the reset node Q maintains a high level.

Continuing to refer to FIG. 17, the display screen 10 may include N fingerprint recognition driving circuits, and the N fingerprint recognition driving circuits are cascaded to form N-stages fingerprint recognition driving circuits, and N is an integer greater than or equal to 2. The fingerprint recognition driving circuit 102-1 and the fingerprint recognition driving circuit 102-2 in FIG. 17 are taken as an example for the description below. The fingerprint recognition driving circuits 102-1 and 102-2 are used to control the R_SW1 input terminal of the fingerprint recognition circuit.

A first input terminal INPUT_1 of the fingerprint recognition driving circuit for n-th stage 102-1 is connected to an output terminal OUT of the (n−1)-th stage of fingerprint recognition circuit, its second input terminal INPUT_2 is connected to a first clock signal CKV2, and its reset input terminal RESET is connected to a second clock signal CKV4.

A first input terminal INPUT_1 of the fingerprint recognition driving circuit for (n+1)-th stage 102-2 is connected to an output terminal OUT of the n-th stage of fingerprint recognition circuit, its second input terminal INPUT_2 is connected to the second clock signal CKV4, and its reset input terminal RESET is connected to the first clock signal CKV2, where n is an integer greater than or equal to 2 and less than or equal to N, Optionally, during the fingerprint recognition execution time period for fingerprint recognition, for the fingerprint recognition driving circuit for n-th stage, the fingerprint recognition clock signal is provided by the first clock signal CKV2, and the second fingerprint recognition reset signal is provided by the second clock signal CKV4; for the fingerprint recognition driving circuit for (n+1)-th stage, the fingerprint recognition clock signal is provided by the second clock signal CKV4, and the second fingerprint recognition reset signal is provided by the first clock signal CKV2; where each stage of fingerprint recognition driving circuit outputs a fingerprint recognition driving signal at its output terminal, under the control of the fingerprint recognition selection signal (e.g., the fingerprint recognition selection signal input(n−1) shown in FIG. 17 and FIG. 18) received at its first input terminal INPUT_1 and the fingerprint recognition clock signal (e.g., CKV2 or CKV4) received at its second input terminal INPUT_2; where effective levels of the first clock signal CKV2 and the second clock signal CKV4 do not overlap with each other, and there is a predetermined phase difference between the first clock signal and the second clock signal.

Optionally, during the at least one time period for display and touch and/or during the fingerprint recognition waiting time period for fingerprint recognition, the first and/or the third fingerprint recognition reset signal is provided to the fingerprint recognition driving circuit for (n+1)-th stage by the first clock signal (CKV2), and the first and/or the third fingerprint recognition reset signal is provided to the n-th stage of fingerprint recognition circuit by the second clock signal (CKV4), the first clock signal including at least one first reset pulse, and the second clock signal including at least one second reset pulse; where the at least one first reset pulse of the first clock signal is synchronous with the at least one second reset pulse of the second clock signal; or there is a phase offset between the at least one first reset pulse of the first clock signal and the at least one second reset pulse of the second clock signal.

During the fingerprint recognition execution time period for fingerprint recognition, the fingerprint recognition driving circuits 102-3 and 102-4 may also work in a similar manner to the fingerprint recognition driving circuits 102-1 and 102-2, which will not be repeatedly described gain herein.

Figure 19:
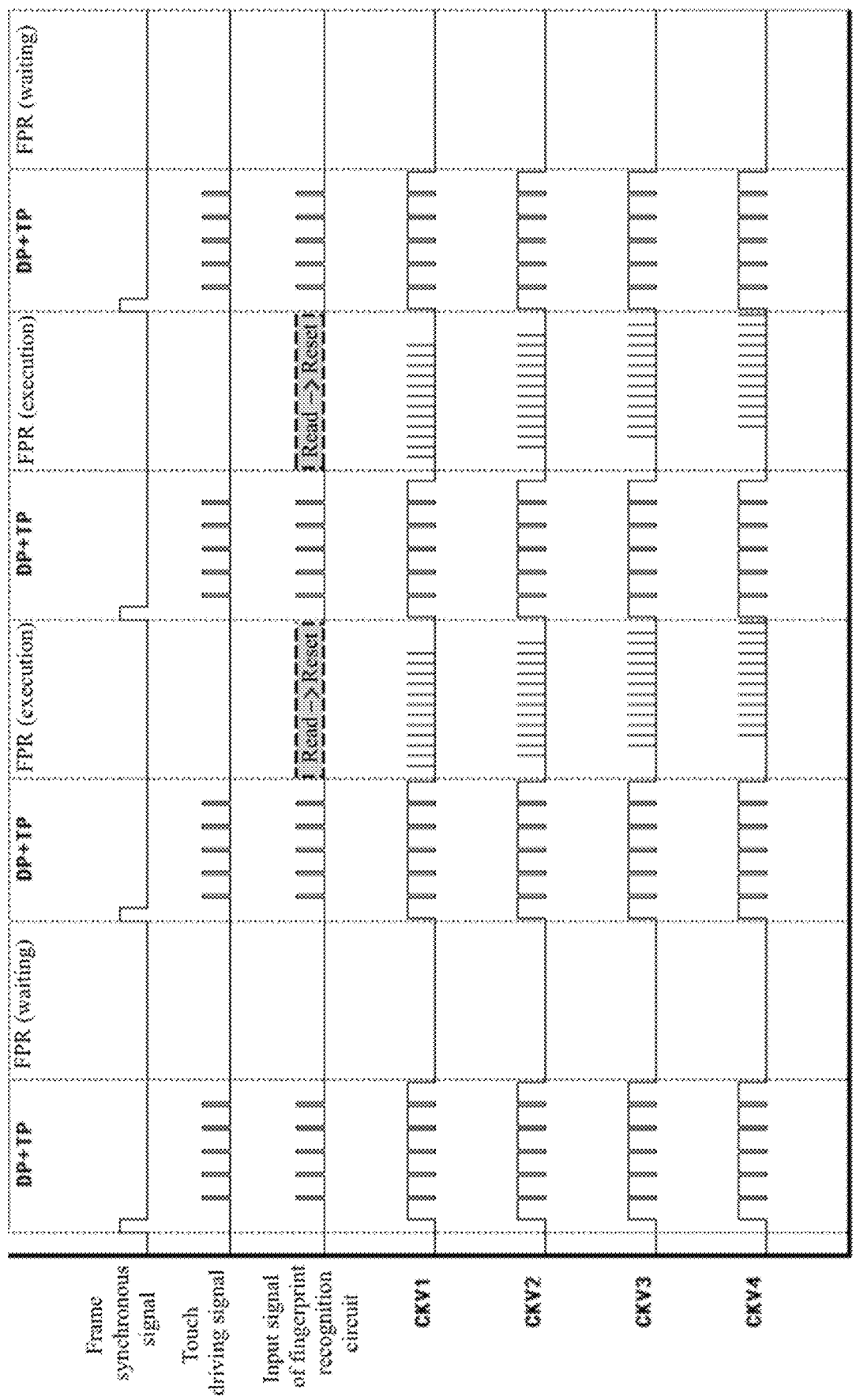
FIG. 19 shows a timing diagram of the fingerprint recognition driving method according to the embodiments of the present disclosure.

Next, FIG. 19 is used to show a timing diagram in which the at least one first reset pulse of the first clock signal is synchronous with the at least one second reset pulse of the second clock signal during the at least one time period for display and touch and/or during the fingerprint recognition waiting time period for fingerprint recognition. FIG. 19 also shows signal diagrams of CKV1 to CKV4 during the fingerprint recognition execution time period for fingerprint recognition.

As shown in FIG. 19, during the fingerprint recognition execution time period for fingerprint recognition, there is a predetermined phase difference between both CKV2 and CKV4, and CKV1 and CKV3, to alternately output fingerprint recognition driving signals to drive each row of fingerprint recognition circuits to read out fingerprint sensing values, and to be reset after readout of the fingerprint sensing values.

For example, when an input of the first input terminal INPUT_1 of the fingerprint recognition driving circuit 102-3 is at an effective level and CKV1 is high, the fingerprint recognition circuit 101-1 is driven to read out its fingerprint sensing value. At this time, a voltage on the wire R_SW2 causes the transistor T3 of the fingerprint recognition circuit shown in FIG. 7 to be turned on. Subsequently, when an input of the first input terminal INPUT_1 of the fingerprint recognition driving circuit 102-1 is at an effective level, and CKV2 is high, the fingerprint recognition circuit 101-1 is driven to be reset. At this time, the voltage on the wire R_SW2 causes the transistor T1 of the fingerprint recognition circuit shown in FIG. 7 to be turned on.

Then at the next clock, when an input of the first input terminal INPUT_1 of the fingerprint recognition driving circuit 102-4 is at an effective level and CKV3 is high, the fingerprint recognition circuit 101-2 is driven to read out its fingerprint sensing value. At this time, the voltage on the wire R_SW2 causes the transistor T3 of the fingerprint recognition circuit shown in FIG. 7 to be turned on. Subsequently, when an input of the first input terminal INPUT_1 of the fingerprint recognition driving circuit 102-2 is at an effective level and CKV4 is high, the fingerprint recognition circuit 101-2 is driven to be reset. At this time, the voltage on the wire R_SW2 causes the transistor T1 of the fingerprint recognition circuit shown in FIG. 7 to be turned on.

Continuing to refer to FIG. 19, in the at least one time period for display and touch, all of CKV1 to CKV4 are synchronous. When all of CKV1 to CKV4 are at an effective level, all of the fingerprint recognition driving circuits 102-1 to 102-4 are reset. At this time, the output terminals of the fingerprint recognition driving circuits 102-1 to 102-4 are pulled down to the voltage on the VSS line, and optionally, pulled down to the ALD signal, thereby outputting the ALD signal. At this time, an interval between adjacent pulses in any signal of CKV1 to CKV4 is shorter than or equal to the preset time interval. That is, even at the moment when any signal of CKV1 to CKV4 is at an ineffective level, since the reset node Q is not completely discharged, the output terminals of the fingerprint recognition driving circuits 102-1 to 102-4 can keep outputting the ALD signal.

Since the voltage of the ALD signal does not cause the transistor T1 or T3 to be turned on, it does not interfere with the exposure process of the fingerprint recognition circuit or affect the charges in the storage capacitor SC. As a result, during time periods for display and touch, the output terminals of the fingerprint recognition driving circuits 102-1 to 102-4 are no longer floating, thereby reducing interference of the fingerprint sensing layer on display and touch signals and improving the accuracy of the display and touch signals.

Optionally, in the fingerprint recognition waiting time period for fingerprint recognition, a synchronous pulse may be applied to CKV1 to CKV4 at the moment approaching the next frame for display and touch, so that the fingerprint recognition driving circuit 102-1 to 102-4 are reset when approaching the next frame. At this time, the output terminals of the fingerprint recognition driving circuits 102-1 to 102-4 are pulled down to the voltage on the VSS line, and optionally, pulled down to the ALD signal, thereby outputting the ALD signal. Since the voltage of the ALD signal does not cause the transistor T1 or T3 to be turned on, it will not interfere with the exposure process of the fingerprint recognition circuit or affect the charges in the storage capacitor SC. Thus, during the time period approaching the next frame for display and touch and the start time period of the next frame for display and touch, the output terminals of the fingerprint recognition driving circuits 102-1 to 102-4 are no longer floating, thereby reducing interference of the fingerprint sensing layer on display and touch signals and improving the accuracy of the display and touch signals.

Figure 20:
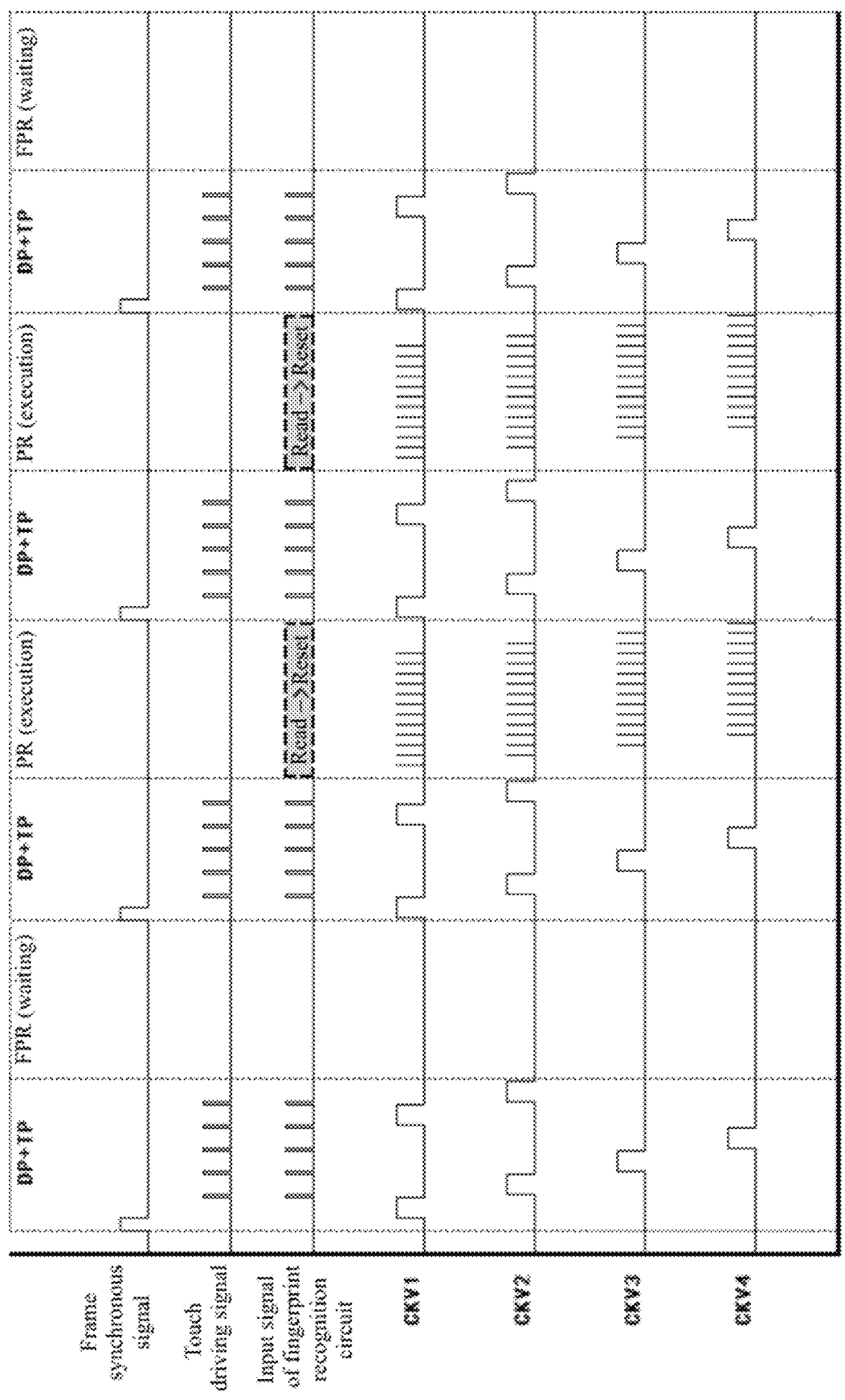
FIG. 20 shows another timing diagram of the fingerprint recognition driving method according to the embodiments of the present disclosure.

Next, FIG. 20 is used to show a timing diagram in which there is a phase difference between the at least one first reset pulse of the first clock signal and the at least one second reset pulse of the second clock signal during the at least one time period for display and touch and/or during the fingerprint recognition waiting time period for fingerprint recognition.

The time sequence of the fingerprint recognition execution time period of FIG. 20 is the same as that of FIG. 19, so it will not be repeatedly described herein.

Referring to FIG. 20, in the at least one time period for display and touch, all of CKV1 to CKV4 are asynchronous. When all of CKV1 to CKV4 are at an effective level, the fingerprint recognition driving circuits 102-1 to 102-4 are reset subsequently. At this time, the output terminals of the fingerprint recognition driving circuits 102-1 to 102-4 are pulled down to the voltage on the VSS line, and optionally, pulled down to the ALD signal, thereby outputting the ALD signal. At this time, an interval between adjacent pulses in any signal of CKV1 to CKV4 is shorter than or equal to the preset time interval. That is, even at the moment when any signal of CKV1 to CKV4 is at an ineffective level, since the reset node Q is not completely discharged, the output terminals of the fingerprint recognition driving circuits 102-1 to 102-4 can keep outputting the ALD signal.

Since the voltage of the ALD signal will not cause the transistor T1 or T3 to be turned on, it will not interfere with the exposure process of the fingerprint recognition circuit or affect the charges in the storage capacitor SC. As a result, during time periods for display and touch, the output terminals of the fingerprint recognition driving circuits 102-1 to 102-4 are no longer floating, thereby reducing interference of the fingerprint sensing layer on display and touch signals and improving the accuracy of the display and touch signals.

Optionally, in the fingerprint recognition waiting time period for fingerprint recognition, a synchronous pulse may be applied to CKV1 to CKV4 at the moment approaching the next frame for display and touch, so that the fingerprint recognition driving circuit 102-1 to 102-4 are reset when approaching the next frame. At this time, the output terminals of the fingerprint recognition driving circuits 102-1 to 102-4 are pulled down to the voltage on the VSS line, and optionally, pulled down to the ALD signal, thereby outputting the ALD signal. Since the voltage of the ALD signal does not cause the transistor T1 or T3 to be turned on, it will not interfere with the exposure process of the fingerprint recognition circuit or affect the charges in the storage capacitor SC. Thus, during the time period approaching the next frame for display and touch and the start time period of the next frame for display and touch, the output terminals of the fingerprint recognition driving circuits 102-1 to 102-4 are no longer floating, thereby reducing interference of the fingerprint sensing layer on display and touch signals and improving the accuracy of the display and touch signals.

Figure 21:
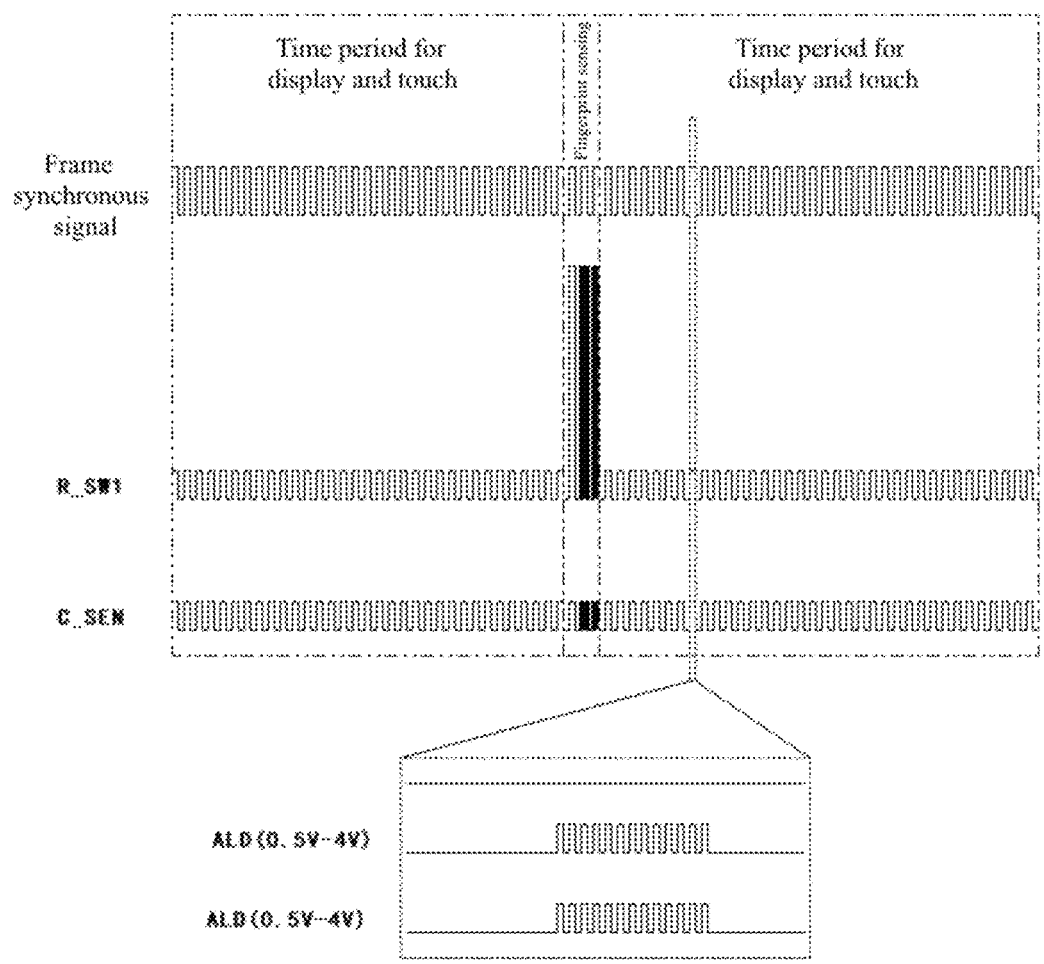
FIG. 21 shows a timing diagram detected in a practical application by the fingerprint recognition driving method according to the embodiments of the present disclosure.

FIG. 21 shows a timing diagram detected in a practical application, and an enlarged diagram of the frame synchronous signal and the ALD signals on the control line R_SW1 and the sensing line C_SEN within display frames for display and touch. A time period for fingerprint sensing refers to a time period from receipt of the fingerprint recognition start signal to completion of fingerprint recognition. During a touch and display period, the control line R_SW1 and the sensing line C_SEN are loaded with an anti-loading driving signal ALD synchronized with a touch driving signal, and the level of the ALD is between 0.5V and 4V. As a result, interference of the fingerprint sensing layer on display and touch signals is reduced, and the accuracy of the display and touch signals is improved.

For this disclosure, there are further the following points need to be explained:

(1) the accompanying drawings of the embodiments of the present disclosure only refer to structures related to the embodiments of the present disclosure, and other structures may refer to the usual design.

(2) the embodiments of the present disclosure and the features in the embodiments may be combined with each other to obtain new embodiments as long as there is no confliction.

Those described above are only specific implementations of the present disclosure, but the scope of the present disclosure is not limited thereto, and the scope of the present disclosure should be subject to the scope of the claims.

What is claimed is:

1. A fingerprint recognition driving method for a display panel, the display panel comprising a fingerprint recognition circuit, a fingerprint recognition driving circuit, and a controller, the fingerprint recognition driving circuit being used to provide a fingerprint recognition driving signal to the fingerprint recognition circuit, the fingerprint recognition driving method comprising:
   periodically arranging, by the controller, time periods for display and touch in a case that the controller does not receive a fingerprint recognition start signal;
   periodically arranging, by the controller, time periods for display and touch and time periods for fingerprint recognition at intervals in a case that the controller receives the fingerprint recognition start signal;
   generating, by the controller, a first fingerprint recognition reset signal during at least one time period for display and touch, and the fingerprint recognition driving circuit being reset under the control of the first fingerprint recognition reset signal, wherein the first fingerprint recognition reset signal includes at least one reset pulse, and a time interval between adjacent reset pulses in the at least one reset pulse is less than a preset time interval, wherein the preset time interval is determined according to a discharge time of the fingerprint recognition driving circuit.

2. The fingerprint recognition driving method of claim 1, wherein the time periods for fingerprint recognition are a first number of the time periods, the first number of time periods for fingerprint recognition includes a second number of fingerprint recognition execution time periods for fingerprint recognition and a third number of fingerprint recognition waiting time periods for fingerprint recognition, and the fingerprint recognition driving method further comprises one of:

generating, by the controller, a periodic second fingerprint recognition reset signal during the second number of fingerprint recognition execution time periods for fingerprint recognition, and the fingerprint recognition driving circuit being reset under the control of the second fingerprint recognition reset signal, wherein the longest interval between the second fingerprint recognition reset signal and the first fingerprint recognition reset signal is less than a preset time interval; or generating, by the controller, a periodic second fingerprint recognition reset signal during the second number of fingerprint recognition execution time periods for fingerprint recognition, and the fingerprint recognition driving circuit being reset under the control of the second fingerprint recognition reset signal, and generating, by the controller, a third fingerprint recognition reset signal during the third number of fingerprint recognition waiting time periods for fingerprint recognition, wherein a sum of the third number and the second number is less than or equal to the first number, and wherein the longest interval between any two of the second fingerprint recognition reset signal, the first fingerprint recognition reset signal, and the third fingerprint recognition reset signal is less than the preset time interval.

3. The fingerprint recognition driving method of claim 2, wherein the first fingerprint recognition reset signal includes at least one reset pulse, and the third fingerprint recognition reset signal includes at least one reset pulse, wherein, a time interval between adjacent reset pulses in the first fingerprint recognition reset signal and the third fingerprint recognition reset signal is less than the preset time interval, and/or a time interval between adjacent reset pulses in the first fingerprint recognition reset signal and the second fingerprint recognition reset signal is less than the preset time interval, wherein the preset time interval is determined according to a discharge time of the fingerprint recognition driving circuit.

4. The fingerprint recognition driving method of claim 2, wherein the display panel comprises N fingerprint recognition driving circuits, and the N fingerprint recognition driving circuits are cascaded to form N-stages fingerprint recognition driving circuits, N being an integer greater than or equal to 2;

a first input terminal of the fingerprint recognition driving circuit for n-th stage is connected to an output terminal of the (n−1)-th stage of fingerprint recognition circuit, its second input terminal is connected to a first clock signal, and its reset input terminal is connected to a second clock signal;

a first input terminal of the fingerprint recognition driving circuit for (n+1)-th stage is connected to an output terminal of the n-th stage of fingerprint recognition circuit, its second input terminal is connected to the second clock signal, and its reset input terminal is connected to the first clock signal, wherein n is an integer greater than or equal to 2 and less than or equal to N, wherein during the fingerprint recognition execution time period for fingerprint recognition, for the fingerprint recognition driving circuit for n-th stage, the fingerprint recognition clock signal is provided by the first clock signal, and the second fingerprint recognition reset signal is provided by the second clock signal;

for the fingerprint recognition driving circuit for (n+1)-th stage, the fingerprint recognition clock signal is provided by the second clock signal, and the second fingerprint recognition reset signal is provided by the first clock signal;

wherein each stage of fingerprint recognition driving circuit outputs a fingerprint recognition driving signal at its output terminal, under the control of the fingerprint recognition selection signal received at its first input terminal and the fingerprint recognition clock signal received at its second input terminal;

wherein effective levels of the first clock signal and the second clock signal do not overlap with each other, and there is a predetermined phase difference between the first clock signal and the second clock signal.

5. The fingerprint recognition driving method of claim 4, wherein, during the at least one time period for display and touch and/or during the fingerprint recognition waiting time period for fingerprint recognition, the first fingerprint recognition reset signal and/or the third fingerprint recognition reset signal is provided to the fingerprint recognition circuit for (n+1)-th stage by the first clock signal, and the first fingerprint recognition reset signal and/or the third fingerprint recognition reset signal is provided to the fingerprint recognition circuit for (n+1)-th stage by the second clock signal, the first clock signal including at least one first reset pulse, and the second clock signal including at least one second reset pulse;

wherein the at least one first reset pulse of the first clock signal is synchronous with the at least one second reset pulse of the second clock signal; or there is a phase offset between the at least one first reset pulse of the first clock signal and the at least one second reset pulse of the second clock signal.

6. The fingerprint recognition driving method of claim 1, wherein generating the first fingerprint recognition reset signal during at least one time period for display and touch includes:

generating the first fingerprint recognition reset signal in each time period for display and touch; or selecting one time period for display and touch from a plurality of consecutive time periods for display and touch, and generating the first fingerprint recognition reset signal in the selected time period for display and touch.

7. The fingerprint recognition driving method of claim 2, wherein:
- a first input terminal of the fingerprint recognition driving circuit receives a fingerprint recognition selection signal, a second input terminal of the fingerprint recognition driving circuit receives a fingerprint recognition clock signal, and a reset input terminal of the fingerprint recognition driving circuit receives a reset input signal;
- wherein the controller provides the fingerprint recognition selection signal to the first input terminal of the fingerprint recognition driving circuit, and the fingerprint recognition driving circuit outputs the fingerprint recognition driving signal at its output terminal under the control of the fingerprint recognition selection signal received at its first input terminal and the fingerprint recognition clock signal received at its second input terminal, and,
- wherein the controller provides the second fingerprint recognition reset signal by the reset input signal, during the fingerprint recognition execution time period for fingerprint recognition;
- the controller provides the first fingerprint recognition reset signal by the reset input signal, during the at least one time period for display and touch; and/or
- the controller provides the third fingerprint recognition reset signal by the reset input signal, during the fingerprint recognition waiting time period for fingerprint recognition.

8. The fingerprint recognition driving method of claim 1, wherein the fingerprint recognition driving circuit comprises an input sub-circuit, an output sub-circuit, a node control sub-circuit, and a reset sub-circuit,
- an input terminal of the input sub-circuit receives the fingerprint recognition selection signal and its output terminal is connected to a first node and makes the first node at an effective level under the control of the fingerprint recognition selection signal;
- a first input terminal of the output sub-circuit is connected to the first node, its second input terminal receives the fingerprint recognition clock signal, and its output terminal serves as the output terminal of the fingerprint recognition driving circuit and outputs the fingerprint recognition clock signal at the output terminal of the fingerprint recognition driving circuit under the control of the first node;
- a first input terminal of the node control sub-circuit receives the fingerprint recognition selection signal, its second input terminal receives the reset input signal, and its output terminal is connected to a reset node, makes the reset node at an ineffective level under the control of the fingerprint recognition selection signal, and makes the reset node at an effective level under the control of the reset input signal, wherein an effective signal of the fingerprint recognition selection signal and an effective signal of the reset signal do not overlap with each other;
- a first input terminal of the reset sub-circuit receives the fingerprint recognition selection signal, its second input terminal is connected to the reset node, its first output terminal is connected to the first node, and its second output terminal is connected to the output terminal of the fingerprint recognition driving circuit, such that the first node is reset under the control of the reset input signal, and the output terminal is reset under the control of the reset node.

9. The fingerprint recognition driving method of claim 8, wherein the first fingerprint recognition reset signal is provided through the reset input signal during the at least one time period for display and touch.

10. The fingerprint recognition driving method of claim 8, wherein:
- during the fingerprint recognition execution time period for fingerprint recognition, the fingerprint recognition driving circuit outputs the fingerprint recognition driving signal at its output terminal under the control of the fingerprint recognition selection signal received at its first input terminal and the fingerprint recognition clock signal received at its second input terminal, and the controller provides the second fingerprint recognition reset signal by the reset input signal, and/or
- during the fingerprint recognition waiting time period for fingerprint recognition, the third fingerprint recognition reset signal is provided by the reset input signal.

11. The fingerprint recognition driving method of claim 1, further comprising:
- during the time period for display and touch, an anti-loading driving signal synchronized with a touch driving signal is provided in at least one of input signals for the fingerprint recognition driving circuit, and the fingerprint recognition driving circuit outputs the anti-loading driving signal at its output terminal to an input terminal of the fingerprint recognition circuit.

12. The fingerprint recognition driving method of claim 1, further comprising:
- during the time period for display and touch, an anti-loading driving signal synchronized with the touch driving signal is provided in at least one of input signals for the fingerprint recognition circuit.

13. The fingerprint recognition driving method of claim 1, further comprising:
- during the time period for display and touch, an anti-loading driving signal synchronized with the touch driving signal is provided in an output signal of the fingerprint recognition circuit.

* * * * *